US005220622A

United States Patent [19]

Scarr

[11] Patent Number: 5,220,622

[45] Date of Patent: Jun. 15, 1993

[54] DATA BASE SEARCHING

[75] Inventor: Robert W. A. Scarr, Stansted, United Kingdom

[73] Assignee: STC PLC, London, England

[21] Appl. No.: 616,871

[22] Filed: Nov. 21, 1990

[30] Foreign Application Priority Data

Nov. 28, 1989 [GB] United Kingdom ................ 8926819

[51] Int. Cl.[5] ............................................. G06K 9/76

[52] U.S. Cl. ....................................... 382/31; 359/29; 359/561; 364/822

[58] Field of Search ............................ 382/31, 42, 65; 364/822; 359/9, 11, 21, 22, 29, 559, 561; 365/216

[56] References Cited

U.S. PATENT DOCUMENTS

| | | | |
|---|---|---|---|
| 3,668,635 | 6/1972 | Mizobuchi et al. | 382/31 |
| 4,174,179 | 11/1979 | Ts-Chudi et al. | 356/71 |
| 4,701,879 | 10/1987 | Scarr | 365/126 |
| 4,837,843 | 6/1989 | Oweckko | 382/31 |
| 5,028,102 | 7/1991 | Ogura et al. | 359/9 |
| 5,086,483 | 2/1992 | Capps | 382/31 |

FOREIGN PATENT DOCUMENTS 2161263 1/1986 United Kingdom .

OTHER PUBLICATIONS

Journal of Optics vol. 20, No. 4, Jul./Aug. 1989 pp. 181-185 Paris. C. Ferreira et al "Anamghoric correlator for character recognition."

*Primary Examiner*—David K. Moore
*Assistant Examiner*—David Fox
*Attorney, Agent, or Firm*—Lee, Mann, Smith, McWilliams, Sweeney & Ohlson

[57] ABSTRACT

A holographic optical correlator includes a matched optical filter and control means therefor including a memory. In use searching for occurrences of an item to be found is carried out by the control means controlling the input and Fourier transform planes of the filter and a coherent light source for parallel optical processing of the memory content and the output plane of the filter provides information to the control means as to the location in the memory of occurrences of said item. The complexity of the detector means in the output plane can be reduced in comparison with previous proposals by moving the item to be sought step-wise across the input plane. The detector means then may comprise a single column of detectors which are required to detect a peak correlation signal within a predetermined range.

37 Claims, 10 Drawing Sheets

W = WIDTH AND HEIGHT OF OBJECT
w = WIDTH OF SCENE
h = HEIGHT OF SCENE

DATA BASE SEARCHING

BACKGROUND OF THE INVENTION

This invention relates to data base searching and in particular to methods and system therefor employing optical techniques.

I have previously proposed an associative optical memory system in my GB Patent Specification 2161263B (U.S. Pat. No. 4,701,879), the contents of which are incorporated herein by reference.

According to claim of 1 GB 2161263B there is provided an associative optical memory system comprising an optical imaging system, in the form of a matched optical holographic filter, and, coupled thereto, a digital computing system including a memory, and wherein in use for searching the computer system memory for occurrences of an item the computing system controls the input and Fourier transform planes of the filter and a coherent light source for parallel optical processing of the memory content, and the output plane of the filter provides information to the computing system as to the location in the memory of the occurrences of said item.

As discussed in my copending GB Application 8903997.8 Ser. No. 2228601A) (R W A Scarr 39) the contents of which are also incorporated herein by reference, the increasingly widespread use of mass optical and magnetic means for storing un-indexed data means that there is a requirement to search large amounts of information in periods of not more than a few seconds. Electronic systems such as CAFS (Content Addressable File Store) enable magabytes of data to be searched against a Key in periods of less than ten seconds. Data bases of the gigabyte order require search times rather shorter than those currently available by electronic means. Optics provide a potential means, probably in combination with electronics, of searching in parallel with a view to reducing the net search time. The present invention is concerned with a content addressable memory as in GB 2161263B and GB 8903997.8 and where the required information is, rather than what it is. The actual retrieval of the information once found within the mass of data is a secondary operation which could use optical techniques, although it is presently considered that it is more likely to use electronic techniques or a combination of optical and electronic techniques.

Currently data is stored largely in the digital form of 8 bit or octet such as an 8-bit ASCII code but one can anticipate an increasing need, in the future, to treat documents in facsimile form or in some mixed mode with hand-written comments, logos, diagrams etc. being distinguished from coded text but linked together within the storage medium. CAFS involve a few parallel channels processing serially strings of binary coded characters and are unsuited to the recognition of graphical material. There are, of course, optical and electronic designs for pattern recognisers that provide a more general approach than CAFS does.

Ideally any pattern recogniser should be able to recognise a pattern independently of translation, scale and rotation. The use of a Fourier transform enables patterns to be recognised independently of translation, and optics provides a virtually instantaneous means of Fourier transforming large amounts of data in parallel. An optical Fourier transform with some scaling means provides a means of combining scaling and translation. Rotation is a more difficult problem. Our co-pending Application GB 8903997.8 was concerned with a translation—independent optical matched filter (correlator) using real-time holographic recording and recognising patterns of known semantic content (i.e. text), especially coding and recognising coded characters. The holographic optical correlator of GB 8903997.8 is a spatially invariant correlator.

SUMMARY OF THE PRESENT INVENTION

According to one aspect of the present invention there is provided a holographic optical correlator including a matched optical filter and coupled thereto a control means including a memory, and wherein in use for searching the memory for occurrences of an item the control means controls the input and Fourier transform planes of the filter and a coherent light source for parallel optical processing of the memory content and the output plane of the filter provides information to the control means as to the location in the memory of occurrences of said item, and including means whereby the memory content is recorded in the Fourier transform plane, using a reference beam from said light source, as at least one coded pattern which comprises an object, wherein the said item sought is a similarly coded pattern and is disposed in the input plane after recordal of said memory content and the matched filter then serves to locate the position of said item sought against a background comprised by said object, and including means whereby the coded pattern of said item sought can be moved step-by-step across the input plane in a first direction, and detection means in the output plane which serve to detect peak correlation signals within a predetermined range that corresponds to said location.

According to another aspect of the present invention there is provided a holographic optical correlator including a matched optical filter and coupled thereto a control means including a memory, and wherein in use for searching the memory for occurrence of an item the control means controls the input and Fourier transform planes of the filter and a coherent light source for parallel optical processing of the memory content and the output plane of the filter provides information to the control means as to the location in the memory of occurrences of said item, and including means whereby the memory content is recorded in the Fourier transform plane, using a reference beam from said light source, as at least one coded pattern which comprises an object, wherein the said item sought is a single similarly coded pattern and is disposed in the input plane after recordal of said memory content and wherein said reference beam is located in the input plane as far as possible from the position of the single coded pattern in at least one dimension.

According to a further aspect of the present invention there is provided a holographic optical correlator including a matched optical filter and coupled thereto a control means including a memory, and wherein in use for searching the memory for occurrences of an item the control means controls the input and Fourier transform planes of the filter and a coherent light source for parallel optical processing of the memory content and the output plane of the filter provides information to the control means as to the location in the memory of occurrences of said item, and including means whereby the memory content is recorded in the Fourier transform plane, using a reference beam from said light source, as at least one coded pattern which comprises an object, wherein the said item sought is a single coded pattern comprising a scene, or a plurality of similarly coded patterns and wherein complementary coding is used for the object and scene.

According to a further aspect of the present invention there is provided a holographic optical correlator including a matched optical filter and coupled thereto a control means including a memory, and wherein in use for searching the memory for occurrences of an item the control means controls the input and Fourier transform planes of the filter and a coherent light source for parallel optical processing of the memory content and the output plane of the filter provides information to the control means as to the location in the memory of occurrences of said item, and including means whereby the memory content is recorded in the Fourier transform plane, using a reference beam from said light source, as at least one coded pattern which comprises an object, wherein the said item sought in a similarly coded pattern and is disposed in the input plane after recordal of said memory content and the matched filter then serves to locate the position of said item sought against a background comprised by said object, and including detection means in the output plane which serve to detect correlation signals within a predetermined range that correspond to said location, and wherein once having detected said location said item sought is removed from the input plane and a point source of light substituted at a specific one of said item's previous bit positions, whereupon N bits of information stored adjacently to said detected location are read out on N columns of detectors in the output plane which comprise said detection means.

According to yet another aspect of the present invention there is provided a method of searching a data base for occurrences of an item including the steps of forming a hologram of the data base contents in the Fourier transform plane of a matched optical filter and loading the item sought in the input plane of the matched optical filter, illuminating the loaded item sought with coherent light from the same source, or a source coherent therewith, as employed to produce the hologram, and detecting correlation signals at the output plane of the matched filter, determining if the correlation signals are within a predetermined range and thus recognition of the item sought in the data base, and in the event of a lack of a peak correlation signal within the predetermined range, moving the item sought step-wise across the input plane and detecting a respective correlation signal for each position thereof, and determining whether or not each said correlation signal is a correlation signal within the predetermined range, which stepwise movement is continued until either all possible steps have been taken or a signal within the predetermined range has been detected.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1A:
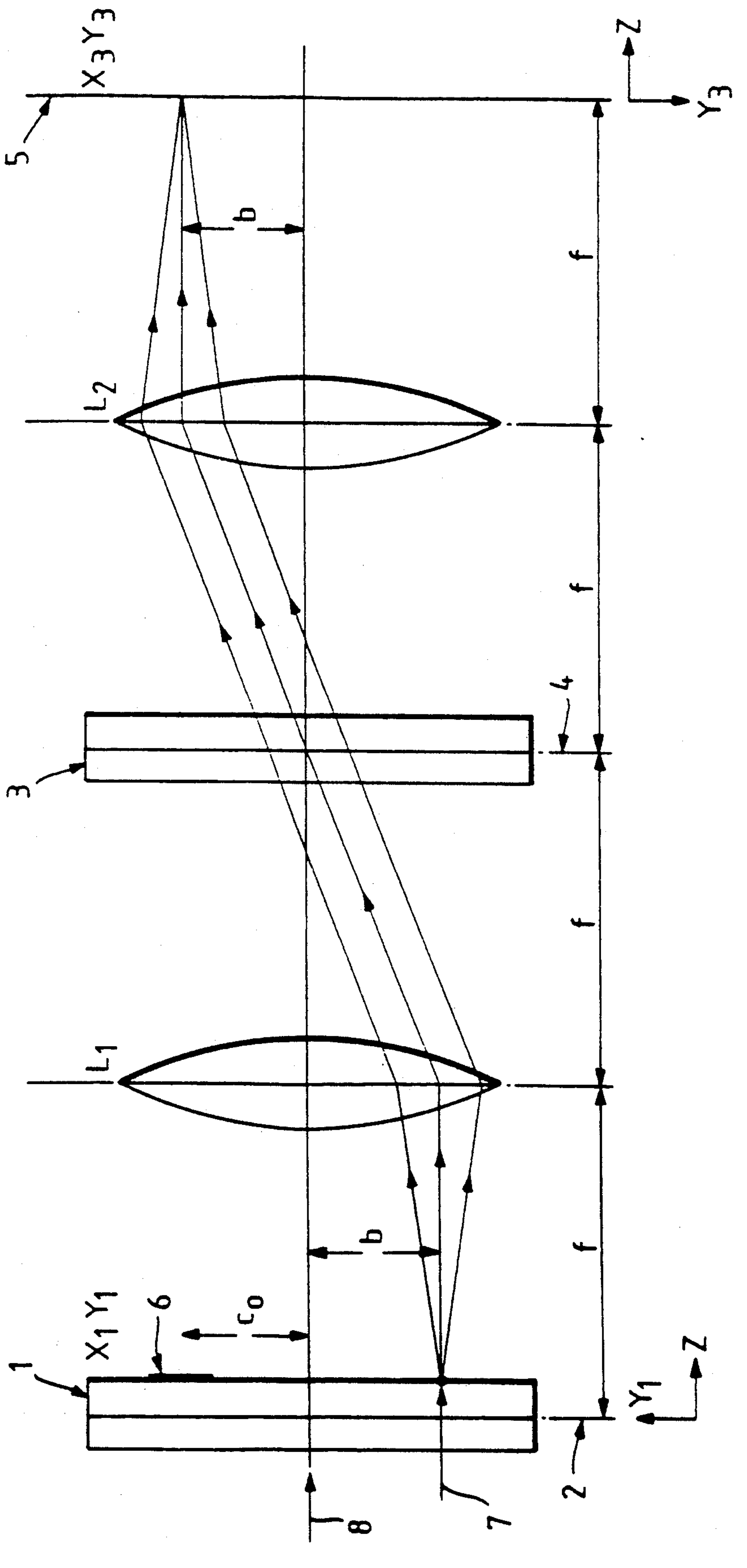
FIG. 1*a* illustrates a basic matched filter arrangement and FIG. 1*b* illustrates the arrangement of FIG. 1*a* together with a digital computing system.

A basic matched filter (Vander Lugt) arrangement for pattern correlation is illustrated in FIG. 1*a*. It consists of an input device 1 situated in an input plane 2, a lens L1, a two-dimensional holographic recording device 3 in the spatial frequency or Fourier transform plane (FTP) 4, a second lens L2 and an output device in the output or correlation plane 5. The three planes 2, 4 and 5 are here assumed to be at the foci of the two lenses L1 and L2. The correlation process involves the joint recording of an object and reference beam and the subsequent recovery of the one from the other by the input of what will be called, in general, the "scene".

Lens L1 acts to provide the Fourier transform of images in the input plane 2 at the FTP 4, and lens L2 acts to provide the inverse Fourier transform of images at the FTP 4 at the output plane 5. The Fourier transform of a real image at the input plane 2 which is illuminated by coherent light (laser pulse) is an interference pattern or hologram.

The first stage in the production of a filter is to record a hologram in the FTP 4 corresponding to the information to be searched. To do this a representation of the information to be searched (image 6) is placed in the input plane 2 (centered at $C_o$) and a point source (laser) reference beam (arrow 7) located at $X=0$ $Y_1=-b$. The coherent light source (laser) used to illuminate image 6 is coherent with the reference beam 7 and hence differs from it only in amplitude and phase. The resultant hologram in the FTP 4 is recorded on suitable material thereat. The lens L2 and the output plane 5 are not required for this process.

Figure 1B:
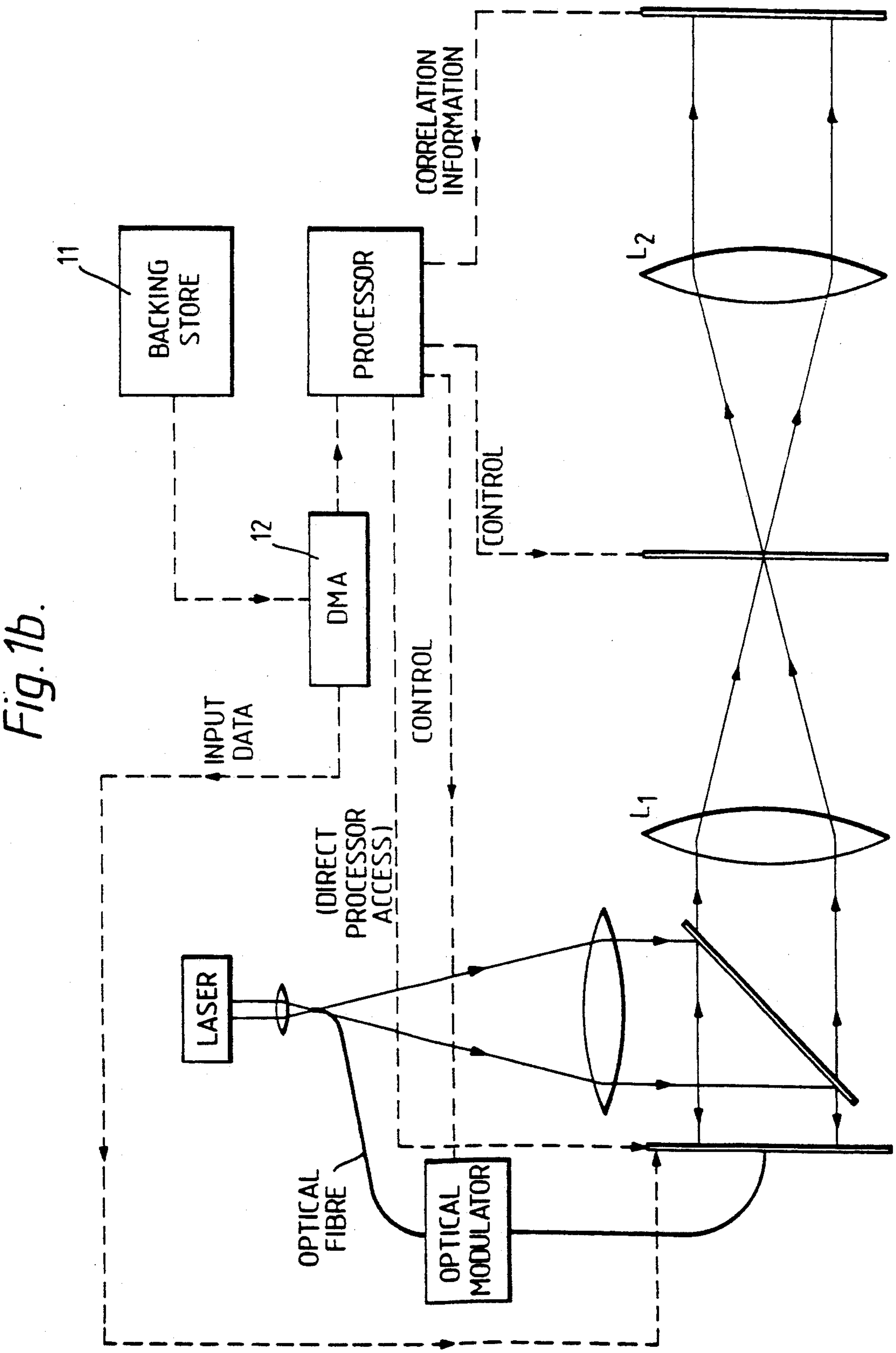

Having thus recorded the hologram of the information to be searched, the pattern corresponding to the information that is sought is placed in the input plane 2 and illuminated by a pulse of coherent light of the same wavelength as is used in the recording process. A basic property of a hologram is that if it is recorded by illumination of two scenes S1 and S2 and then exposed to light from S1, a real or virtual image of S2 will result, or vice versa. In a matched filter a real image is produced at the output plane 5. S1 can be regarded as the point source and S2 initially as the information being searched, S2A, and latterly as the sought pattern, S2B. If the recorded (search) S2A pattern contains the information sought (S2B), the result will be on presentation of S2B in the input plane be a representation of the point source in the output plane 5. This represents the autocorrelation, or matching, of the input to the filter. With suitable design, the autocorrelation spot will be more intense than any cross correlation terms and thus, for example, a peak detector can determine its presence and position in the output plane 5. Its position in the output plane bears a one-to-one correspondence with its position in the input plane. Thus "where" the information is can be conveyed to a processor, for example, which then determines "what" the information is, as described in GB 2161263B. As also described therein, the information to be searched may be directly loaded into the input plane from a backing store using direct memory access prior to forming the hologram in the Fourier transform plane. FIG. 1*b* illustrates a matched filter as in FIG. 1*a* together with a digital computing system as described in GB 2161263B and indicates the backing store 11 and direct memory access 12. The digital computing system comprises a control means for the matched filter. In the correlator described in Application No 8903997.8 a two-stage recognition system may be used for an item to be recognised which comprises a string of characters. In a first stage individual characters of the string are matched and in a second stage means are provided to recognise when the sets of matched characters are in the correct relative juxtaposition.

Figure 2:
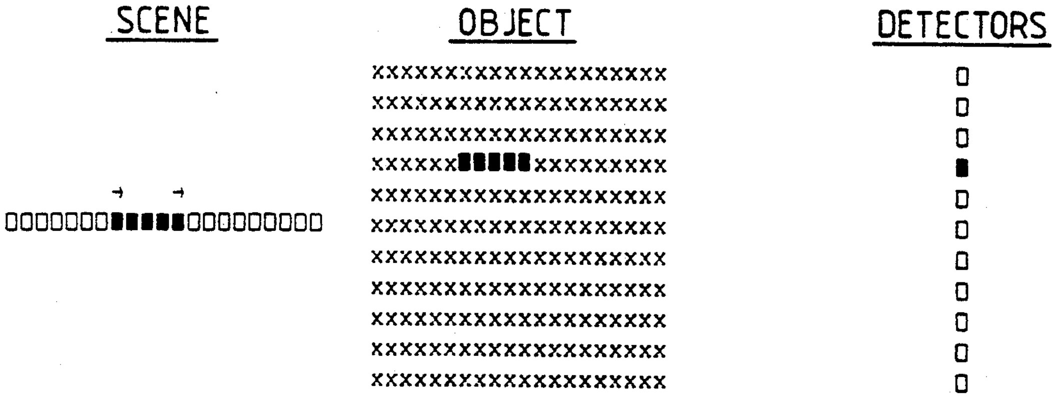
FIG. 2 illustrates, schematically, a 1D1 spatially variant correlator.
Figure 3:
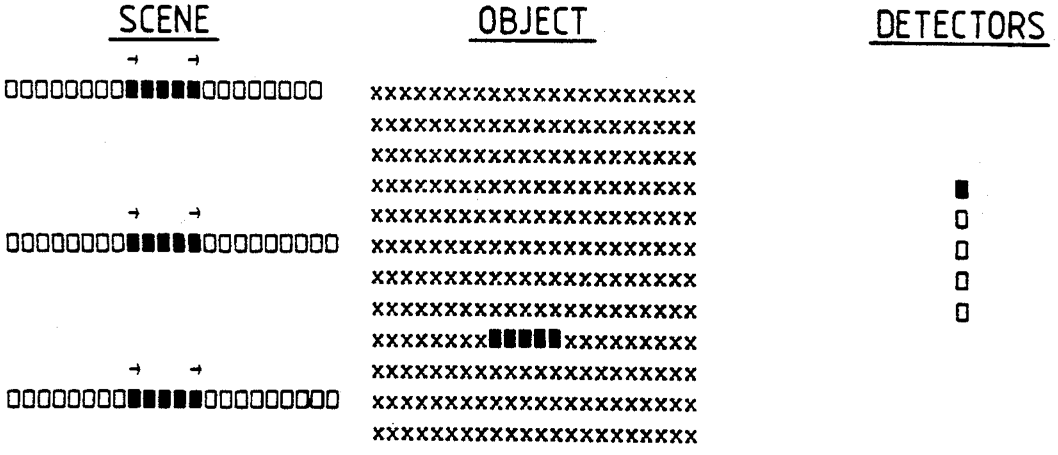
FIG. 3 illustrates, schematically, a 1DR spatially variant correlator.
Figure 4:
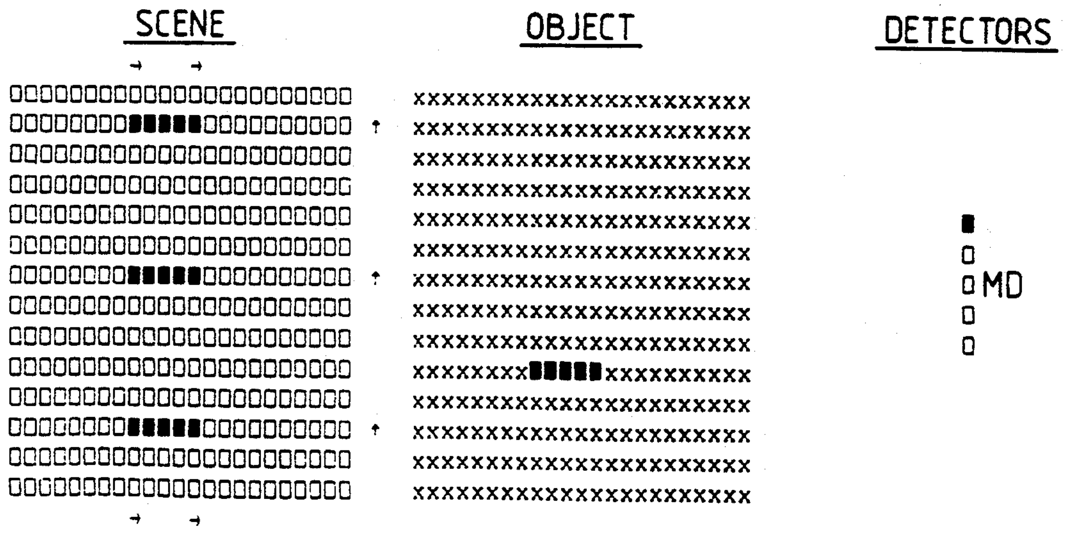
FIG. 4 illustrates, schematically, a 2D spatially variant correlator.

The correlators of GB 2161263B and Application No 8903997.8 are spatially invariant correlators. The advantage of a spatially invariant approach is that a scene can be presented at one point in the input plane and will be recognised irrespective of the spatial relationship of the presentation position to the position of its replica in object data. The whole of the object data is searched in parallel in one operation which on the face of it looks like being the fastest means of searching. However the cost of spatial invariance is high in terms of the following factors:

(a) Lens performance.
(b) Output/plane detector/processing device area,
(c) Forces the use of thin holograms of low efficiency,
(d) Indirectly results in low coding efficiency Bearing in mind that the data in the scene is a very small subset of the data in the object field that is being searched, it is worth considering the implications of an approach in which the scene data is moved above in the input plane until it is aligned to some degree with its match in the object field. Three possible approaches (search strategies) will now be considered for shifting the same data:

(a) One dimension once,
(b) One dimension replicated in parallel,
(c) Two dimensions These three possibilities are illustrated in FIGS. 2, 3 and 4 respectively.

Referring to FIG. 2 the one dimension once (1D1) strategy will first be considered. A shift register (scene) with optical output and containing the scene data is loaded at the extreme left hand X-position and central Y-position of the input plane. There is a vertical column of detectors (say y in number) placed centrally in the output plane, rather than a matrix of detectors, e.g. a silicon diode array, as referred to in GB 2161263A. The extent of the vertical column is such that it covers all possible relationships in the Y-dimension between object and scene data. The character spacing is the same for scene and object beams, unlike in the pattern substitution technique referred to in 8903997.8 where the spacing of characters in strings to be sought differs from the spacing of strings of the memory as input to the input plane so that corresponding correlation patterns are produced and in the second stage strings with required correlation pattern shape are picked irrespective of their contents.

The scene is shifted in a step-by-step fashion through the shift register and hence across the input plane. For each position of the scene the holographic filter produces a correlation signal. The detectors are programmed to detect a peak correlation signal within a specified range. This range depends on the length of the string, the Y coordinate of the detector and the X coordinate of the scene. The detector threshold can thus be programmed to allow for spatial variance in the performance of the correlator. Because the number of detectors required is much reduced compared with the space invariant case, it is possible to consider more elaborate detection algorithms. A match occurs when the X-coordinates of the scene and object beams are in alignment and the detector, having the correct spatial relationship in the Y-dimension, detects a peak within the specified range. This may be due to a correct match or may be due to a near match because it is very unlikely that match and mismatch signals will never overlap.

If it is desired to distinguish a mismatch from a match in the optical domain, then the following procedure can be adopted:

(1) On detection by any detector of a peak within range, stop the X-shifting operation;
(2) Turn off the optical output of the shift register;
(3) Lower the threshold of the relevant detector to discriminate a match on one character (this should be well within pre-defined tolerance limits);
(4) Turn on the optical output of the shift register for each character in the string one-at-a-time;
(5) At the relevant detector count the number of characters above threshold and if this agrees with the string length accept the match.

It should be noted that because a large degree of spatial invariance is still required in the Y-dimension, a thin hologram is still a necessity.

Whilst only a single column of detectors is referred to above, it may be advisable to have more than one such column so that the peak correlation signals can be detected by any column. This is because there may be a compromise between the amount of step-wise movement of the sought pattern across the input plane and the number of detector columns.

With structured data, e.g. records, where the layout of data in the object field in the X-dimension is known in advance, it it possible to write the data into the relevant position or positions in the X-dimension rather than shifting it in a step-by-step fashion. With unstructured data and if character alignment is achieved then the stepping process can be character-by-character rather than bit-by-bit.

The search algorithm in practice would be rather more complicated than as outlined above because of the need to deal with multiple matches.

A one dimension replicated in parallel (1DR) search strategy will now be considered with reference to FIG. 3. A thick hologram is assumed. The above description of the 1D1 strategy (FIG. 2) applies to the 1DR strategy except that there are replicated shift registers each containing the scene data which is stepping in synchronism through them. The spacing in the Y-direction of these shift registers depends on the fall-off in response of the thick hologram relative to the peak response at the Bragg angle. The more directionally selective the hologram the more replications are required. If it is assumed that there are R shift registers then the number of detectors required to be placed centrally in the output plane becomes y/R.

When, on shifting the scene in the X-direction, apparent alignment is achieved there is ambiguity as to which of the scene registers is producing the signal, all the shift registers have their optical output switched off and then switched on again one-by-one in order to locate the relevant one (or ones). If the signal still remains above threshold it is not due to the summation of a main lobe from the relevant register and a side lobe from another Y-register and the same procedure is then followed as discussed for the 1D1 strategy.

In the Y-direction the middle detector in the set will respond in cases where the scene data in the relevant shift register happens to be perfectly aligned with the object data and will produce the greatest output for a given input signal. The further away the responding detector is from the middle of the set, the weaker its response is going to be and clearly the detector thresholds will have to be programmed to allow for the shape of this response curve.

As indicated above, the response of a thick hologram has side lobes, making aliasing a problem that becomes more severe perhaps as R increases.

A two dimensional (2D) shifting search strategy will now be discussed with reference to FIG. 4. The procedures are the same as for 1DR except that once an approximate match is found in the X-dimension the output of the relevant shift register is shifted in the Y-direction until a match is achieved on the middle detector of the set. There is clearly in this case a need for the number of shift register cells to at least approach the number of bits in the object field and furthermore to be able to shift information in two directions. This additional complication is considered to be unwarranted unless the algorithms necessary in the 1D1 and 1DR cases for detector threshold sensitivity prove intractable. It should be noted that the final decision in the 2D case is always made using the same detector element (Master detector—MD) and thus this element could be separate from and considerably more complex than if it were part of an array of elements.

Rather than actually to shift information physically in the Y-direction, a simple approach might be to load all rows with the information but initially only to turn on enough rows to obtain the approximate match. Once this has been found then the appropriate intermediate row can be turned on to give the "aligned" match.

Figure 5:
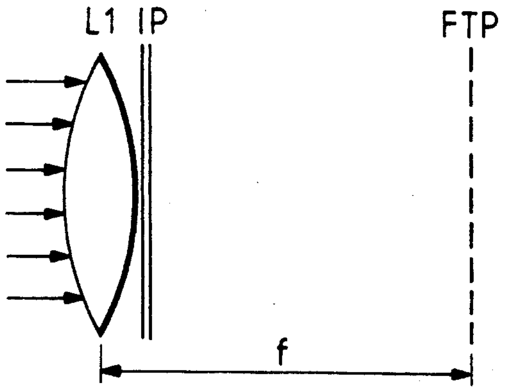
FIG. 5 illustrates a converging beam configuration.

It should be noted that the matched filter arrangement of FIGS. 1*a* and *b* is such that the input, FTP and output planes are at the foci of the two lenses, which arrangement is called the f—f configuration. There are, however, other Fourier transform geometries for the recording stage of a matched filter, in particular the CB or converging beam configuration rather than the f—f configuration in which only L1 of FIG. 1*a* is confocal. In the CB configuration the input plane (IP) is between the lens L1 and the FTP and adjacent to L1, so that the input plane is in a converging beam. See FIG. 5.

Ideally the illuminating beam needs to have a flat phase wavefront and uniform amplitude and this depends on good beam collimation which can be achieved at the expense of some loss of power. The accuracy of the Fourier transform system depends on the validity of some of the approximations on which the spherical lens theory depends, the precision with which the three planes are located with respect to the foci of the lenses and freedom of the lenses from aberration. A lens of a finite size does not collect all of the light coming from a source plane and thus there is a spreading or defocussing of the spot in the inverse Fourier transform process and a loss of spectral information in the Fourier transform. The effect of this vignetting increases as the distance of the data in the object and scene plane from the optical axis increases, resulting in a smaller correlation signal.

For a given filter geometry it should be noted that the object data is equally subject to vignetting whether or not the filter is spatially invariant. In the invariant case it is possible to place the scene data centrally which minimises vignetting, but replicating the scene data in the variant case tends to make vignetting worse.

Third order aberrations are spherical aberration, coma, radial astigmatism, field curvature and distortion. Leaving aside the question of whether the lenses of the correlator have these aberrations, they are potentially present in the holographically recorded filter and depend on the geometry of that filter. In the f—f configuration only distortion is present whereas in the CB configuration spherical aberration and coma can be eliminated, and curvature can be corrected for. Whilst distortion affects scaling, its effects can probably be corrected for in the calibration of a practical system. This leaves astigmatism as the most significant third order aberration for CB geometries. It should be noted that for a CB geometry all forms of third order aberration disappear when the object and scene data are aligned, i.e. the 2D case.

It was concluded by Joyeaux and Lowenthal ("Optical Fourier transform: what is the optimal set-up?" Applied Optics, 21, 23 pp 4368–4372, Dec 1982) that in the majority of cases the CB arrangement gives better or comparable performance at lower cost. The factors that influenced this decision are: (a) In the f—f configuration special purpose Fourier transform lenses are needed and because of vignetting these need to have a large aperture and commercially available items did not have particularly short focal lengths. Whilst such lenses could give better performance when used in some f—f configurations than they can in corresponding CB ones, each case needs to be considered on its merits; (b) The CB design could use ordinary doublet or triplet lenses (not specifically designed for Fourier transforming) which were cheaper. The performance of these lenses in the CB set-up was markedly superior to that achievable by the same lens in an f—f configuration.

The effect of astigmatism in the context of specific filter geometries will now be considered but it must be noted that in doing so the effect of any further distortion of a similar nature that might be introduced into the inverse transform process is ignored. There is no suggestion in the literature that there is a further fundamental distortion but distortion can be introduced by the lens that performs the inverse transform function. Lens distortion can presumably be reduced to an acceptable level at a price.

R W Meier ("Magnification and third order aberrations in the holography" J. Optic. Soc. Amer. 55, Aug. 8, 1965, pp 987–992) defines the aberration $W(\rho,\theta)$ of the reconstructed waveform as the difference between the third-order expansion of the phase of the waveform actually diffracted by the hologram and that of an ideal spherical wavefront issued from a point source the coordinates of which are predicted by the first-order approximation. $\rho$ and $\theta$ are the polar coordinates in the hologram plane. In the following we use the notation of M J Bage and M P Beddoes ("Lenseless matched filter: operating principle; sensitivity to spectrum shift, and third order holographic aberrations" Applied Optics 15, Nov. 11, 1976, pp 2830–2839 which was based on the above work of R W Meier) except that we use r, o and s to represent reference, object and scene beams (rather than r, s and t). Each of these beams is a single point source and any specific arrangement of these spots is referred to as a "pattern geometry". It is assumed that the hologram is at the focus of the lens and therefore $D_r = f$, where f is the focal length, and that the geometry is such that $\alpha = 1$, $\beta = -1$ and $\delta = 1$. The expression for astigmatism is then:

$$(W(\rho,\theta) = -\chi(\rho^2/f)(A_{xx}\cos^2\theta + A_{yy}\sin^2\theta - 2A_{xy}\sin\theta\cos\theta)$$

where $$A_{xx} = \theta_{xs}\theta_{xs} - \theta_{xo}\theta_{xo} + \theta_{xr}\theta_{xr} - (\theta_{xs} - \theta_{xo} - \theta_{xr})(\theta_{xs} - \theta_{xo} + \theta_{xr})$$

$$A_{yy} = \theta_{ys}\theta_{ys} - \theta_{yo}\theta_{yo} + \theta_{yr}\theta_{yr} - (\theta_{ys} - \theta_{yo} - \theta_{yr})(\theta_{ys} - \theta_{yo} + \theta_{yr})$$

$$A_{xy} = \theta_{xs}\theta_{ys} - \theta_{xo}\theta_{yo} + \theta_{xr}\theta_{yr} - (\theta_{xs} - \theta_{xo} + \theta_{xr})(\theta_{ys} - \theta_{yo} + \theta_{yr})$$

where $\theta_{1i} = 1i/f$, with L=x or y are the coordinates of the points for the three beams indicated by i=r, o, s.

The equation for $W(\rho, \theta)$ gives the astigmatism at any one point in the hologram plane but the net effect shows up in the reconstructed waveform in the output plane after inverse Fourier transformation which involves an averaging process. To treat the complete inverse transform in two dimensions would be extremely calculation intensive and the approach adopted here is first to investigate the effect of filter geometry on the peak value of $W(\rho, \theta)$ and an average value over the hologram plane; and secondly by taking one dimensional cross-sections in the Fourier plane to establish what a tolerable level of astigmatic distortion is. If a one dimensional cross-section is taken along the axis in the Fourier plane with maximum astigmatism then this will show the worst case astigmatism in the output plane along the corresponding axis. By taking a sequence of cross-sections, a two dimensional picture for the spot shape in the output plane can be established.

A computer program was written which calculates $W(\rho, \theta)$, gives the peak or worse case astigmatism in the FTP, calculates an average value of astigmatism and the standard deviation of aberration (SDA) using equation (59) of Bage and Beddoes. These calculations are based on giving equal weight to all points in the FTP and therefore apply to the case of an input (delta function) spot of limiting size and uniform spectrum, i.e. a spot much smaller than is capable of being resolved by the bandwidth of the holographic filter. Optionally the program provides corresponding average and SDA results for spots with rectangular and Gaussian profiles of specified size. For a comparison of the relative performance of various pattern geometrics it does not matter which of these measures is used and the average value is taken hereafter. A delta function spot is also assumed in all the results quoted unless otherwise specified. The effect of limited bandwidth and finite spot size is taken into account when simulating the inverse Fourier transform progress and this shows the average effect of astigmatism on spot shape for a real system.

A program for inverse Fourier transform simulation was modified to include the effects of astigmatism by adding the astigmatic phase error profile to the phase term in the Fourier transform.

Figure 7:
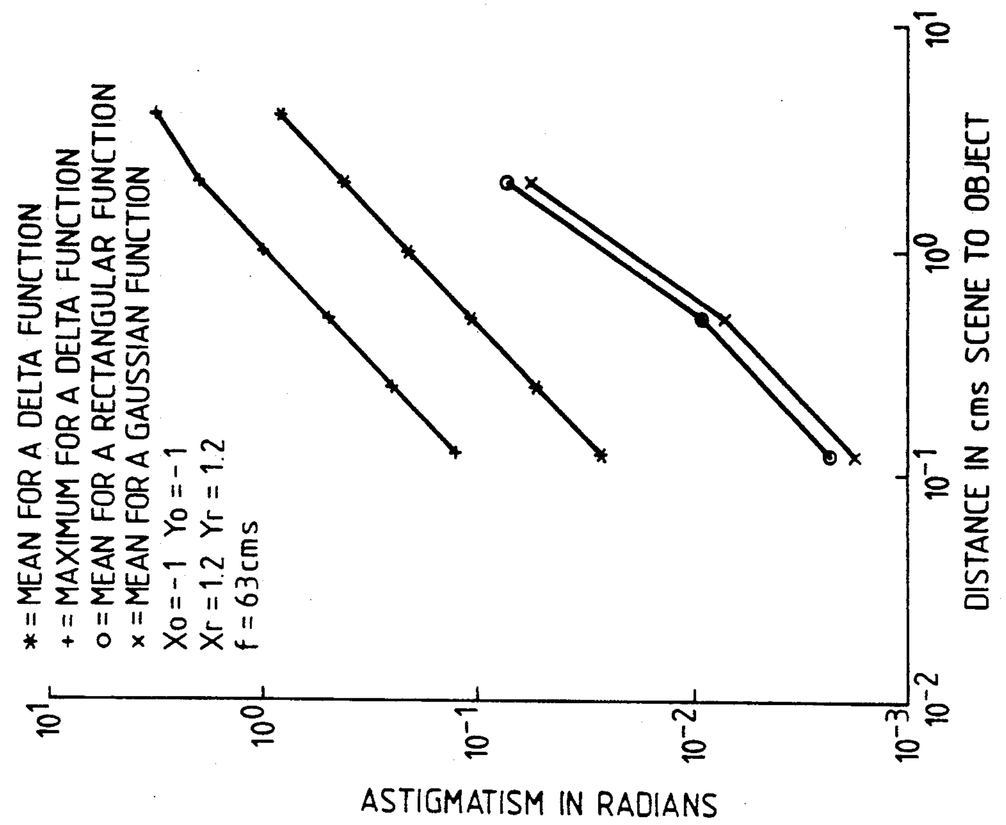
FIG. 7 illustrates the effect on astigmatism of the distance between the scene and the object.
Figure 6:
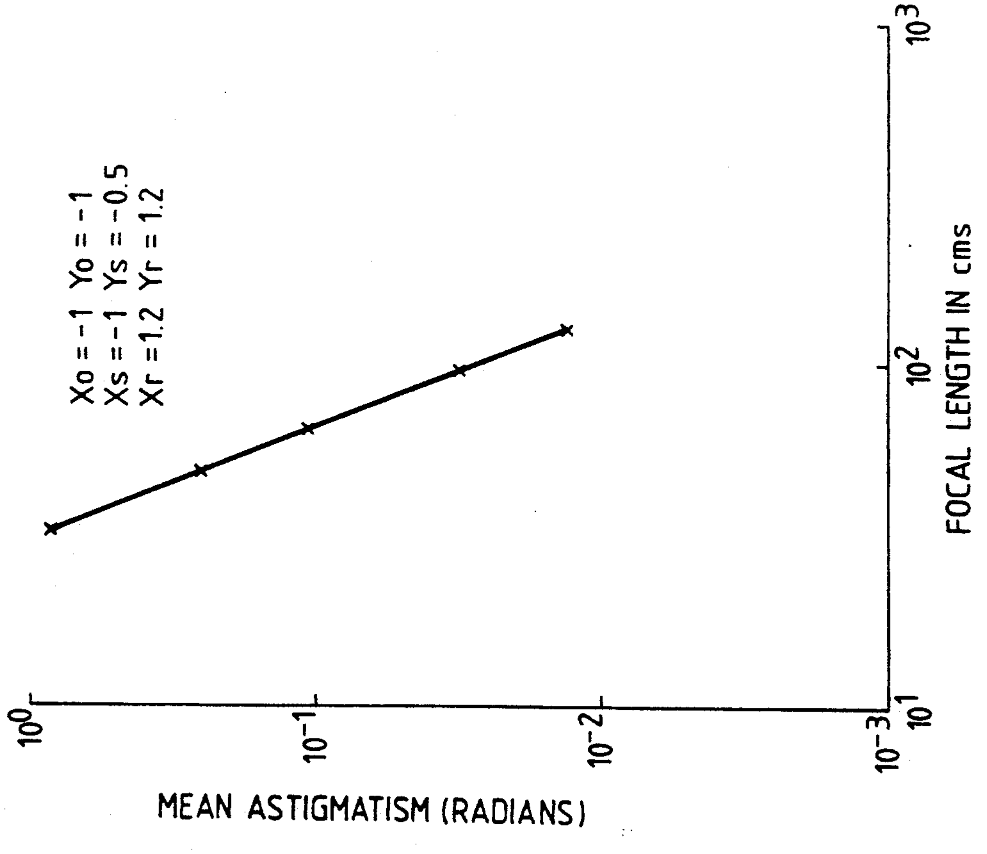
FIG. 6 illustrates the relationship between lens focal length and astigmatism.
Figure 9:
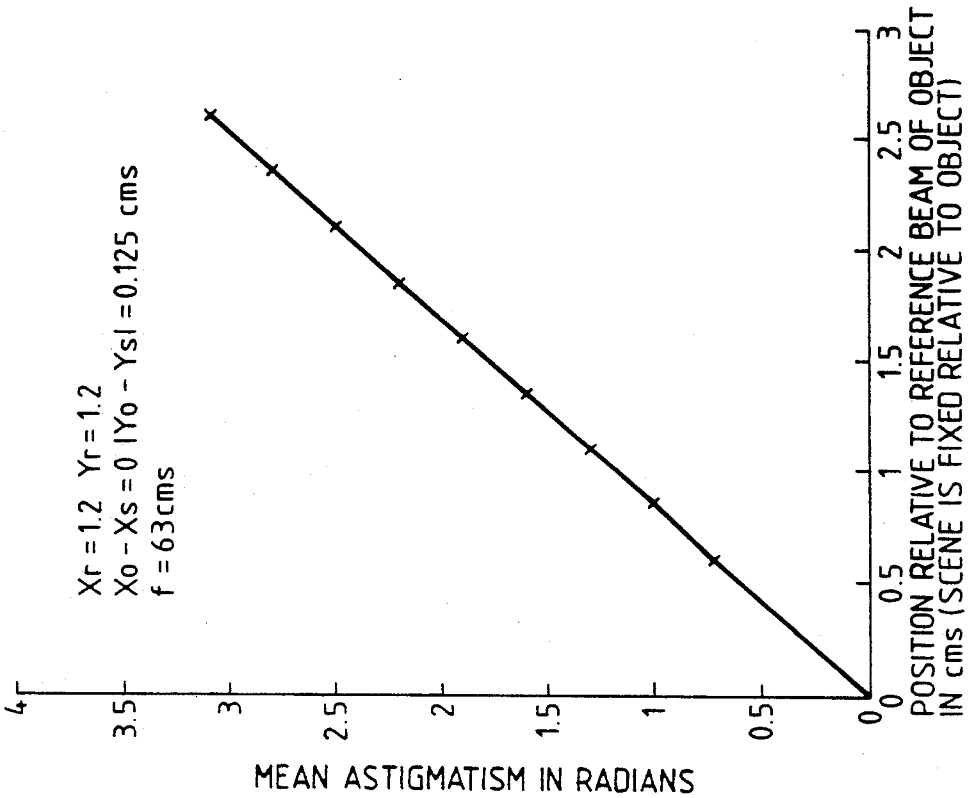
FIG. 9 illustrates effect on astigmatism of position relative to the reference beam.
Figure 8:
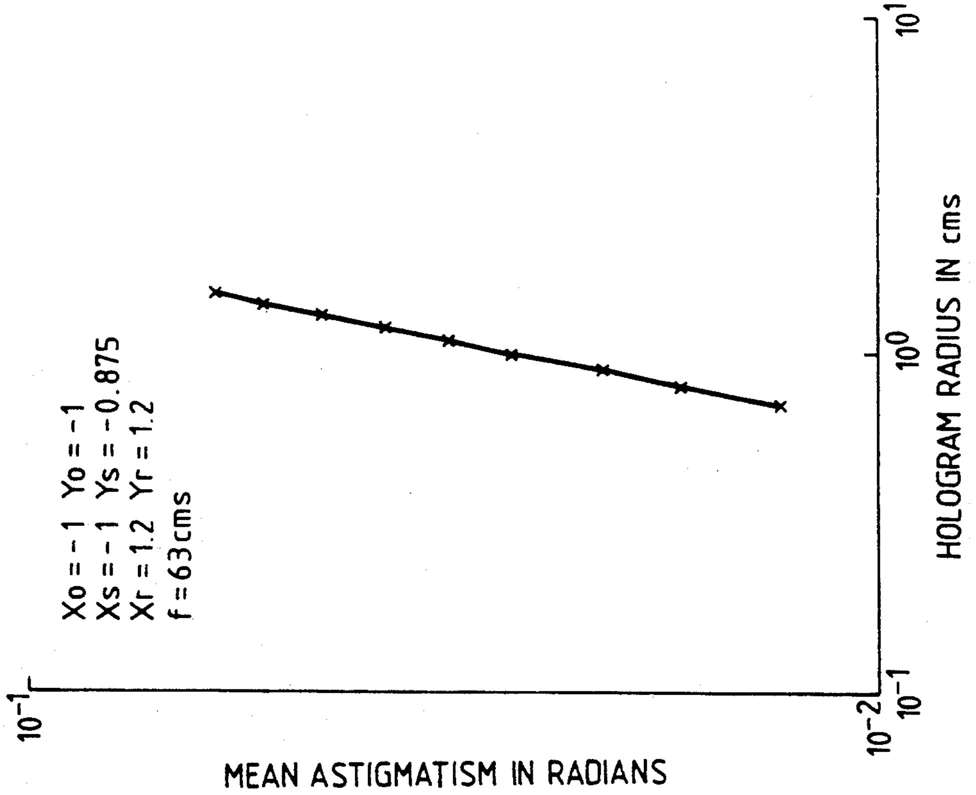
FIG. 8 illustrates variation of astigmatism with hologram radius.
Figure 10:
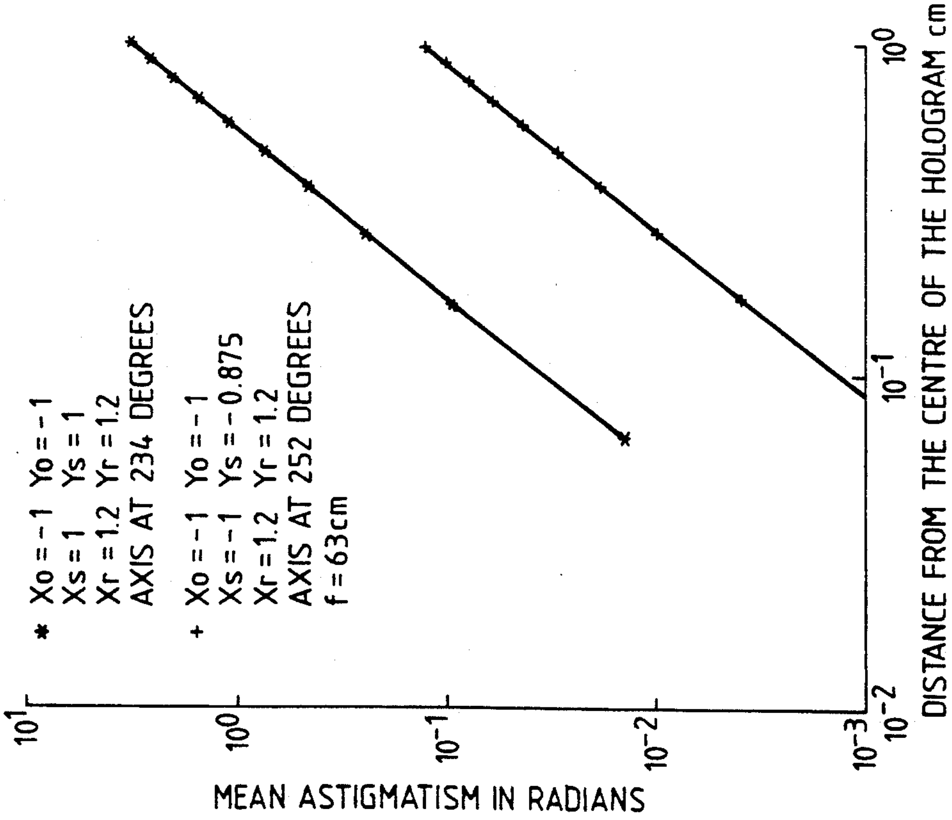
FIG. 10 illustrates astigmatism as a function of radial position—worst case axis.

FIG. 6 shows the effect of varying the focal length of the lens on astigmatism is an inverse cube law as theory predicts. Although shown for one particular pattern geometry, the inverse cubes law applies generally. FIG. 7 shows the effect on astigmatism of the distance between the scene and the object. This curve gives the average and maximum aberration for a delta function and shows the effect of spot shape on the average value. Note that for $X+Y<2$, $X=O$. The law in this case is linear for movement in one dimension at least. This too accords with simple theory. FIG. 8 shows how astigmatism varies with hologram radius and shows a square law relationship, again as theory suggest. FIG. 9 shows how astigmatism varies as the position of the scene and object beam are moved along a diagonal of the input plan with their positions relative to each other fixed. The relationship is a linear one. FIG. 10 gives the worst case astigmatic cross-section for two pattern geometrics. The relationship is a square law one and is symmetrical about the origin. The angle for minimum astigmatism is orthogonal to the angle for maximum astigmatism and the variation of astigmatism for fixed $\rho$ is, to a good approximation, of the form:

$$\text{Astig} = A_o + A_1 \sin(\theta + \phi)$$

where $A_o$ and $A_1$ are constants ($A_o > A_1$), $\theta$ is the angular position in the hologram plane and $\phi$ is an angle that depends on pattern geometry.

Figure 11:
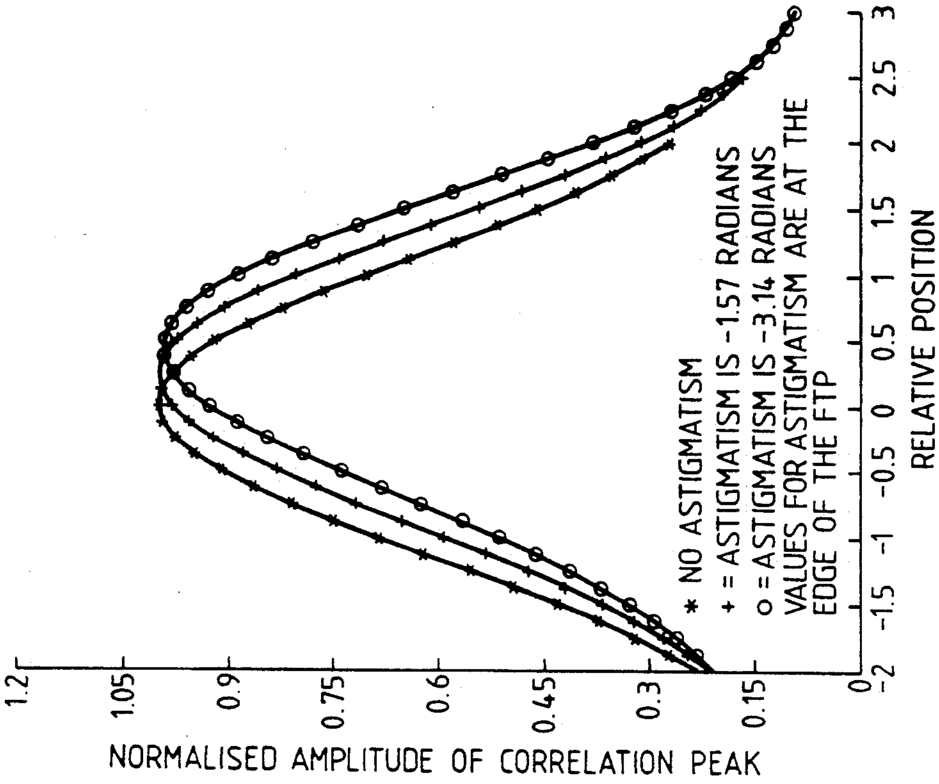
FIG. 11 illustrates the effect of astigmatism at the output plane.

FIG. 11 shows the effect on the correlation pattern in the output plane of taking the worst case cross-section astigmatism for two pattern geometries and is compared with the case of no astigmatism. The effect on the correlation peak position is very much more significant than it is on correlation peak amplitude. An average astigmatism value of 0.9 radians or 0.14λ gives a shift in correlation peak position of about half a pulse width, which is probably about the limit of acceptability. Of course this is astigmatism along the worst axis and the direction of this axis in relation to detector geometry will need to be considered in the content of a specified hologram filter and output plane design.

Figure 12:
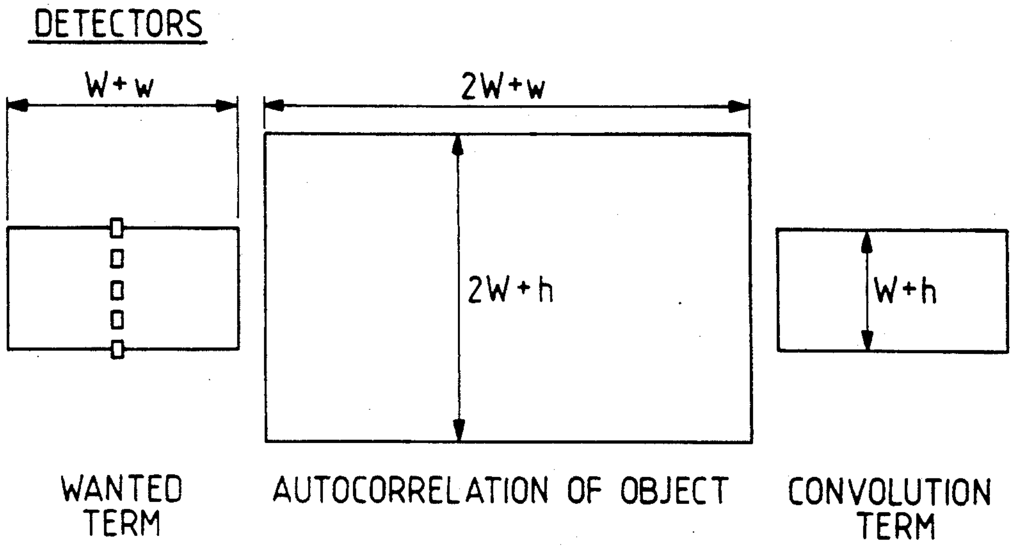
FIG. 12 illustrates relatives positions for the inverse Fourier Transform Terms in the output plane.

All the above results were obtained with the reference beam on a diagonal and outside of the area occupied by the object, i.e. the object field. In fact the reference beam need be outside the object in one dimension only. The situation is illustrated in FIG. 12 which shows the relative positions for the inverse Fourier Transform terms in the output plane and where the reference beam coordinates are $X_r = 1.2$ and $Y_r = 0$. In this situation the effect in going from a space invariant design to one in which there are varying levels of replication for a fixed filter geometry are summarised in the following table I.

TABLE 1

| Configuration | $X_o$ | $Y_o$ | $X_s$ | $Y_s$ | Worst Case Mean Astig (Radians) | Notes |
|---|---|---|---|---|---|---|
| Invariant | −1 | −1 | 0 | 0 | −0.31 | central scene |
| Invariant | −1 | −1 | −1 | 0 | −0.11 | scene at edge |
| Variant 1D1 | −1 | −1 | −1 | 0 | −0.093 | |
| Variant 1D2 | −1 | −1 | −1 | −0.5 | −0.046 | |
| Variant 1D4 | −1 | −1 | −1 | −0.75 | −0.023 | |
| Variant 1D8 | −1 | −1 | −1 | −0.875 | −0.012 | |
| Variant 1D8 | −1 | −1 | −1 | −0.875 | −0.0054 | dual beam |

For the invariant case the starting assumption was that having the scene at the centre of the input plane would give the optimum position. However, as the above table shows putting the scene at the edge i.e. at the opposite extremity to the reference beam in the X-direction, gives a significant reduction in astigmatism.

Figure 13:
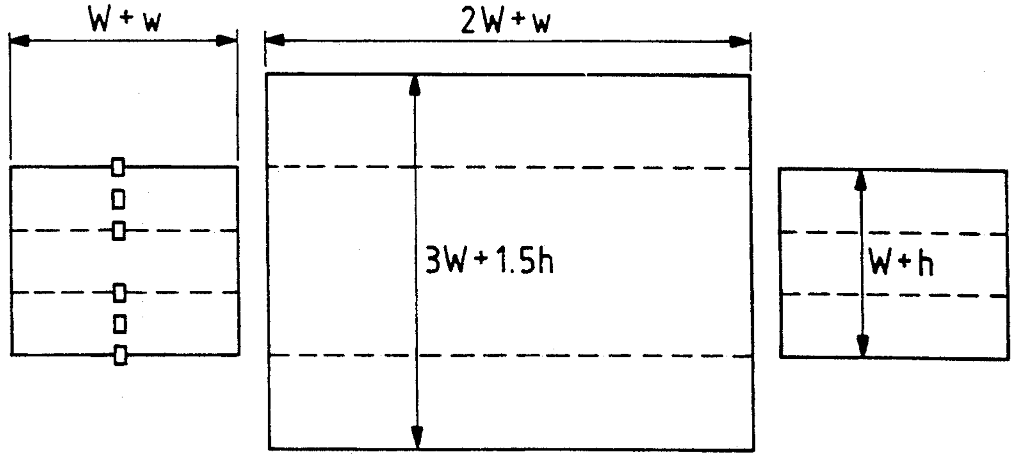
FIG. 13 illustrates dual reference beam with correlation beams in the output plane overlaid.

By recording the hologram twice with two reference beams displaced from the Y-axis by equal amounts, as shown in FIG. 13, which shows the dual reference beam case with correlation beams in the output plane overlaid and where the reference beam coordinates are $X_r=1.2$ and $Y_r=\pm 0.25$, between the dashed lines are the pattern overlap regions, it is possible to reduce the astigmatism by an additional factor of two (see "dual beam"-variant 1D8 entry in the above table). It should be noted that in FIG. 13 the detectors in the output plane are separated. They will not work in the region where the two patterns overlap. In general, therefore, multiple holographic recording of the same material can be employed to reduce astigmatism in the variant case.

The table shows that in going to a replication of eight times in the variant case the astigmatism is reduced from that in the invariant case by a factor of nine times. Perhaps the most surprising aspect of the results in the above table is that the variant times one replication (1D1) case is only marginally better than the invariant case. In the invariant case there is little difference between the astigmatism for the worst case position of the scene and the astigmatism in the best case, while with the 1D1 configuration there is a marked difference between the worst case position and the best case one. Thus on average, as the position of the scene varies, the 1D1 arrangement is significantly better, however it is the worst case that counts.

The effect of the above on correlator dimensioning is indicated in Table 2 which relates to a CB configuration. It is assumed that a "page" of input data is transferred optically from a backing store on to an input device. Pages are square and of linear dimension P. The object feature size of data in the input plane is A for the object and scene beams. The maximum possible input data in bits (non redundant storage in M bits) $B_m$, is $P^2/A^2$. From the simulation results and assuming that the limit on astigmatism is λ/8, the relationship between focal length f and x (hologram diameter and input plane size) is given by:

$$f^3=17500\,x^4$$

If the limit on astigmatism is λ/n rather than λ/8, then the formula is $$f^3=17500\,x^4\,n/8.$$

The wavelength $\lambda=0.63$ μm in Table 2

TABLE 2

| Replications | x = 1 cm P = 0.71 cm | | | x = 2 cm P = 1.41 cm | | | x = 4 cm P = 2.8 cm | | |
|---|---|---|---|---|---|---|---|---|---|
| | f | A | $B_m$ | f | A | $B_m$ | f | A | $B_m$ |
| Invariant | 26 | 26λ | 0.75 | 65.5 | 33λ | 1.8 | 165 | 41λ | 4.8 |
| Variant R = 1 | 25.3 | 25.5λ | 0.78 | 64.3 | 32.1λ | 1.86 | 162 | 40.5λ | 5.0 |
| R = 2 | 19.5 | 19.5λ | 1.33 | 49.1 | 24.5λ | 3.2 | 124 | 31λ | 8.6 |
| R = 4 | 15.3 | 15.3λ | 2.12 | 38.6 | 19.3λ | 5.1 | 97 | 24.3λ | 13.6 |
| R = 8 | 12.5 | 12.5λ | 3.27 | 31.3 | 15.5λ | 7.8 | 79 | 19.8λ | 20.9 |

The storage capacity ($B_m$) results above for the CB configuration are in fact comparable with those calculated for an invariant f—f configuration. For an f—f configuration it is necessary to consider a specific lens, in the following a Tropol 710-6328 is assumed. This lens has a focal length of 86 cm and a radius (r) of 5 cm. In this $B_m=r^4/(8f^2\,\lambda^2)$ and assuming $\lambda=0.63$ μm, $B_m=0.0106/\lambda^2=2.8$M bits. The hologram radius (x) in the case is 2.5 cm, the input is confined to a square of side 3.54 cm (P) and $A=34\lambda$.

Thus both the CB and f—f configurations are applicable to the invariant case but the CB configuration is preferable for the variant case, the cheaper lens and lack of vignetting constituting a significant advantage. Large values of R increase the capacity of the correlator for a given focal length of its lens, although a large value of R does mean that the cost of replicating the scene needs to be considered.

The effect on coding efficiency of the variant approach will now be considered. In the aforementioned Application GB 8903997.8 an item to be searched is in the input plane as a coded pattern and the object data in the input plane comprises a similarly coded pattern. The code is an M out of N code, in particular a sparse code comprising 3 out of 13 for octet data. The limitations set by the intra-symbol interference are discussed in GB 8903997.8. In a bandwidth limited optical system (when attempting to match a single character in isolation) the minimum bit spacing is determined by the crosstalk or intra-symbol (intracharacter) interference between adjacent correlation peaks. The closer the bit spacing the more probable that the amplitude of the wanted peak will be influenced by the skirts of the unwanted adjacent peak. It was assumed in GB 8903997.8 that a one has a unit bit position or width that matches the available bandwidth. It then transpires that the spacing between ones has to be at least two units in order to reduce the intra-symbol interference to an acceptable level. This applies in two dimensions so that the gaps between rows has to be at least two unit as well as the gaps between bits of a word within a row. It is possible to devise codes for which the use of adjacent bit positions is not allowed. The 3 out of 13 code becomes a 3 out of 17 code, implying that in a three bit code there are $17-13=4$ dissallowed bit positions. Two bit positions are also needed between words and if a delimiter is required another 3 bit positions must be added. Thus an octet of data occupies, with a delimiter, 23 units or bit positions. The coding density is reduced by a factor of $3\times23/8=8.625$ in comparison with the case where there is no redundant coding and zero spacing between bits. If no delimiter is required the redundancy factor reduces to 7.5 times. These conclusions were derived for the invariant case but they also apply to the variant case if during the individual character recognition phase a fixed threshold is used for the detectors. However we do know in the variant case what the individual characters are that we are attempting to match and hence it is possible to adapt the detector thresholds to allow for intra-symbol interference associated with a specific character (Steps (3) and (4)) above in the mismatch/match distinction procedure. If this is done it is possible to increase the coding density in the X-direction where the bit pattern is in effect known but not in the Y-direction where the content of adjacent rows is not known. If the coding density is reduced to the point where there is no space between adjacent bits in a row, 3 out of 13 coding is maintained, there is a delimiter bit and there are two spaces between words, then the redundancy factor becomes $3\times16/8=6$, compared with 8.625, an improvement of 30%. Whilst a similar technique could be applied to the invariant case the very much greater number of detector elements involved make it less of a practical proposition.

The speed of searching in the variant case will now be considered. The 1DR arrangement will be considered as being the most general and results for the 1D1 and 2D arrangements can be readily deduced from it.

(1) The initial search phase. There are N columns, or N potential bit positions in the scene registers/stores. The character length is B bits so that there are N/B positions where a match has to be considered for unstructured data. For structured data it will be assumed there will be P positions where field alignment can occur (P of the order 1 to 5). The time taken for the scene registers to work by horizontally shifting the data, or rewriting it into the relevant positions, is $t_a$. Once the data is in position the time to record a match or a mismatch is taken to be $t_b$. Thus for unstructured data the search time is $$t_{1u} = \frac{N}{B}(t_a + t_b) \text{ and for structured data}$$

$$t_{1S} = P(t_a + t_b)$$

(2) When a match or near match is detected it is necessary to find which scene register is producing the wanted signal and then to process the string character-by-character for confirmation or rejection. If there are R replications, the time to present and check each replication is $t_a+t_b$, the hit/miss rate is $H_1$, the string length is S and the time to present and check a single character again is $t_a+b_b$ with a hit/miss rate $H_2$. Then the time taken $t_2$ for both structured and unstructured data is:

$$t_2=(SH_2+RH_1)(t_a+b_b)$$

If D is the number of characters in the data base search, C is the number of characters per frame and $b_r$ is the frame rate. The total search time $T_u$ for unstructured data is:

$$T_u = t_r D/C + (t_a + t_b)\left(\frac{N}{B} + SH_2 + RH_1\right)$$

and for standard data, $T_s$ is:

$$T_s=t_rD/C+(t_a+t_b)(P+SH_2+RH_1)$$

For the variant approach to be attractive $$(t_a+t_b)<<t_r.$$

If $t_r$ is of the order of 1 ms, $t_a$ and $t_b$ need to be of micro-second order.

Compared with the invariant approach of GB 8902997.8 the variant IDR approach allows a thick holographic recording material to be used; simplifies the complexity and cost of processing in the output plane of the correlator; makes feasible the use of a shorter focal length lens for a given frame capacity, allows an increase in coding efficiency at the expense of increased output processing; makes the CB configuration preferable with consequent reduction in less cost and reduction in vignetting. However, this is at the expense of increasing the complexity of the scene presentation means and increasing the within frame processing time.

So far the design of the optical correlator has been considered in the context of a simple search of a structured or unstructured data base. Logical operations on a structured data base will now be considered together with the repercussions on the design of the correlator.

The data base is assumed to consist of "records" each of which is either:

(a) specified by program to be of completely fixed format and constant length, or (b) the record contains a fixed number of fields but the overall length is variable, individual fields in the record are of known but not constant length.

If necessary each record can be formatted or delimited in some way so that it is possible to search records sequentially in the absence of any key at all. Generally, of course, there will be a key or keys to each of one or more fields in a record during a search operation. Because the optical correlator needs to know the absolute relative spatial position of fields before it can perform a parallel logical (AND) operation on them, only the record layout (a) is satisfactory. The variable length record (b) needs to be transformed into a form that is suitable for an optical search method.

The completely fixed record format will be considered specifically but the points discussed apply in principle to a variable length record after transformation. A 1DR (variant) correlator design is assumed in which the scene is aligned in the X-dimension with the object. For unstructured data this involves a step-by-step shift of the scene across the input plane. With "structured" records there is scope for avoiding this stage of the search procedure because either the absolute position of a record can be fixed in advance or, by finding the start of one record, the relative positions of the other records can be calculated. If the records are laid out in a regular pattern the possible X-coordinates corresponding to start of a record can have a very limited set of values and only these values need to be used while searching. There is, of course, a trade-off between achieving a regular pattern and efficient use of storage space.

The accurate alignment of records based, say, on a start of record "character" means that it is no longer necessary to provide a delimiter for each character in the record and this both saves space and improves the recognition tolerance.

The error rate is determined by the setting thresholds for the detectors in the output plane of the correlator. The lower the threshold setting, the more "wrong" records will be picked. These can either be presented to the user to be considered as possibles in a fuzzy match situation or eliminated in a subsequent stage of processing. Thus error rate can be traded to some extent for search time.

In considering the logical operations to be performed on data bases, frequent reference is made to a paper entitled "Implementing a relational database by means of specialised hardware" (E Babb, ACM Transactions on Database Systems, 4, Mar. 1, 1979, ppl-29). This paper considers way of performing logical operations on files, such as join and projection, but it does so in the context of extending existing CAFS electronic hardware to include specialised bit mapping units. How the basic logical functions are to be performed by the optical correlator will now be discussed.

The basic correlator performs an AND function on separate fields, for example:

find all bicycle parts costing £125 that are manufactured by G. This involves a triple (bicycle, 125, G); and all three fields in a record must satisfy the condition for that record to be retrieved.

Suppose we asked:

find all bicycle parts costing £125 that are manufactured by G or H, or perhaps all bicycle parts costing £125 that are manufactured by G and H. Then it is necessary to perform more than one operation on the field designated "manufacturer". In the first case we get the union of two sets and the second the intersection. Leaving aside the question of how to deal with sets, we first consider how best to perform multiple searches on the same field. There are three alternatives:

(a) to present two copies of the scene, one with G in the third field and the other with H;
(b) to present bicycle and £125 and G and then to replace G by H;
(c) to present bicycle and £125 and when a match occurs to read out the field named manufacturer for separate processing.

The first approach (a) is dismissed because in order to resolve ambiguities as to which of the two scenes is producing the match it is necessary to turn one of them off, making the approach essentially serial. The choice between (b) and (c) could be either or both and depends on what types of search the system is required to make and the number and range of the variables.

The logical operation called "NAND" can be looked at from two points of view:

(1) As a requirement specified by the user as part of a search operation, a so-called high level NAND
(2) As a means of carrying out various logical operations in the implementation of a machine, a so-called low level NAND It is well known that with a series of AND gates and logical inversion any type of logical operation can be carried out so it is clearly possible to divorce the logical operation as specified by the user from the instrumentation in a machine of the sequence of low level logical steps necessary to achieve a particular result. In what follows there is concerned only the second of these two possibilities.

A type of NAND logic is described in the literature (see for example Mirsalehi, Guest & Gaylord: Applied Optics, 22, 22, 1983 pp 3583-3592) based on phase coding of the object and scene so that a match is achieved by signal cancellation to produce null. This was considered to have similar tolerance problems to AND logic and because there was no simple way of controlling the phase of the input signals it has not been considered worth pursuing. It has now been realised that there may be some advantage in a type of NAND logic based on making the scene the complement of the object. That is if the scene contains a character that has the code 1001001000000, the object would have the complementary code 0110110111111 in the matching condition. Because the result depends on an absence of correlation rather than a cancellation to produce a null, it is much less sensitive to tolerances in light levels. This enables the coding efficiency for a basic 8-bit code to be improved from a 3 out of 13 code to a 5 out of 10 code. There are however some problems with code alignment to prevent aliasing that are still being investigated. If these problems are solved there is potential for a further reduction in the overall coding redundancy from 6 to 3.75 times.

In the aforementioned paper by Babb three operations on lists are considered, (1) selection, which is that described above, (2) projection and (3) join.

"Projection" is a list reduction process in which an existing list has fields removed from it and the new list that results, and which in general contains redundancy, has its redundancy eliminated. The elimination of the redundancy is computationally intensive because it involved up to N! comparisons (where N is the number of items on the list). Babb gives an example where the manufacturers names are eliminated to produce a shorter list consisting purely of part numbers and prices.

"Join" in terms of set theory is the intersection of a number of lists and the items from those lists are selected that have a specified field(s) of the same value. Generally the selection of the common value is made conditionally for the items on each list. Thus there is a list reduction stage, in which each list is reduced in accordance with the specified conditions, and then a comparison stage, in which common values between the lists are sought. These common values are then presented as the answer to the query. Babb gives an example where a specific supplier is joined to a specific customer by means of common parts and the list of these common parts is then printed out.

In a sense, therefore, projection and join are inverse operations, projection eliminates common factors and join accepts them. While projection works within a list, join can work within or between lists. However if multiple lists in the join case are concatenated, this distinction largely disappears and what is needed is a mechanism for discriminating like members of a list. In the case of the extension to CAFS this leads to an approach in which potential linking items within or between lists are made to set bits in a bit map, which setting is then used to perform the projection or join operation. The difficulties with this approach are concerned with the means for addressing the bit map. The linking items can be coded by a precompiled index which whilst resulting in an efficient implementation of the bit map store requires a prior knowledge of which fields are likely to be used for linking purposes. The alternative is to use hash coding based on the content of the linking field(s) which means an increase in bit map store size, perhaps not a too serious consideration, but, more importantly, it means having an exception mechanism for coping with the situation where two hash codes lead to the same store address. For an optical solution the use of precompiled indexing and hash coding is not considered but the use of electronic mapping techniques as an aid to searching would be allowable.

If a hologram is made of a list in isolation, that is without a reference beam, then this may be regarded as a joint transform of all the items on the list. On illumination of the resultant hologram by a point source all the common terms will correlate, giving rise to a set of correlation signals in the output plane of the correlator. There are, however, a number of serious difficulties with this approach:

(a) The ghost image of the object, the image of the reference beam and the correlation signals are not separated into distinct regions of the output plane.
(b) Like items in the list that are very close together will have a correlation signal positioned very close to the image of the reference beam and will be masked by its much greater amplitude.
(c) Correlating items of equal relative spacing will have coincident correlation signals.
(d) Correlating signals will vary in intensity proportional to the lengths of the field(s) concerned.
(e) Because of the joint transform approach it is not possible to use the serial, character-by-character, search technique that we have previously proposed as a means of resolving ambiguities with a Vander Lugt correlator.

For the join case, when the comparison is between lists, the lists, compared two at a time, can be kept physically separated in the input plane of the correlator, so that difficulties (a) and (b) can be avoided at the expense of a reduction in the usable area of that plane. For the projection case the difficulties are unavoidable. This, in a situation where it is extremely difficult, if not impossible, to resolve a multiplicity of correlation signals in the output plane of the correlator, a joint transform approach is not applicable.

We now consider, in the light of the above difficulties, how the Vander Lugt correlator (spatially variant) we have proposed above might best be used to achieve the projection and join operations.

In the projection case the objective is to search a specified file containing a list of records. The selection of records for inclusion can be either conditional or unconditional. Once selected, a record is reduced to contain a specified number of target fields and a non-redundant list of these fields is printed out, made into another file, or both. The basic spatially variant correlator is employed together with an electronic bit map store which holds a map corresponding to the file record positions in the backing store (FIG. 1*b*).

Figure 14:
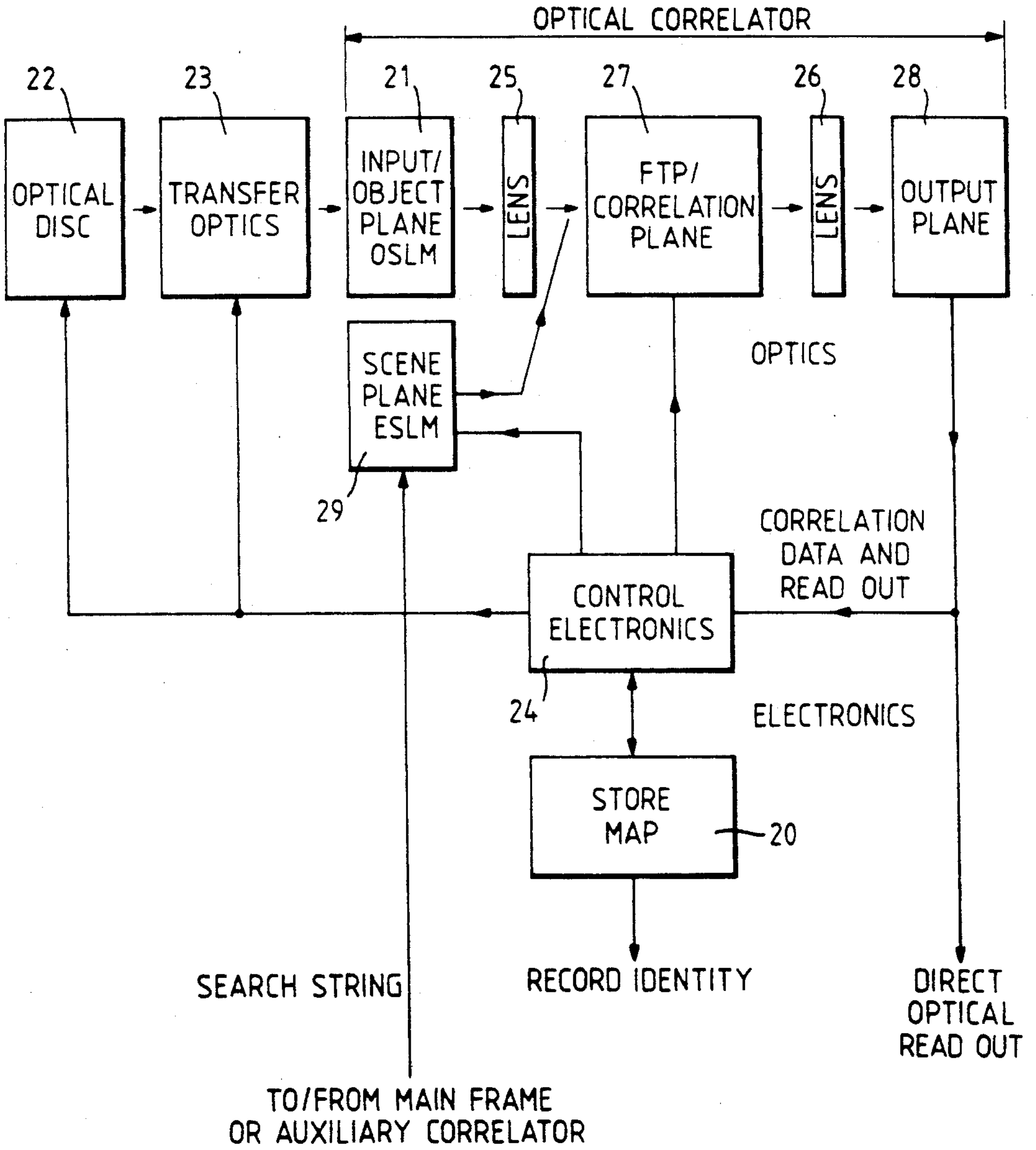
FIG. 14 illustrates a block schematic diagram of an optical correlator with optical access and an electronic store map.
Figure 15:
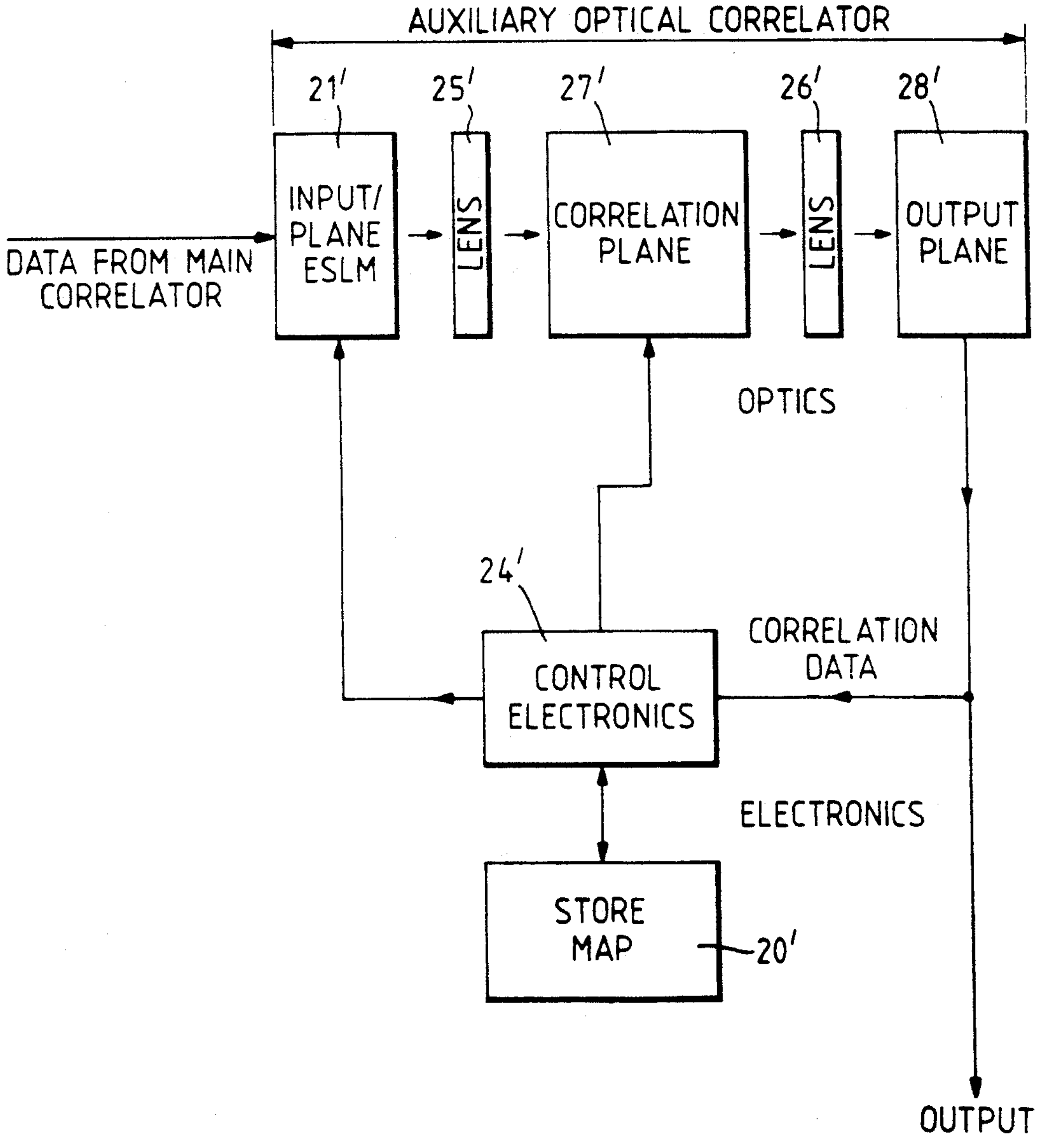
FIG. 15 illustrates a block schematic diagram of an auxiliary correlator which has electrical input.

FIG. 16 shows a block schematic diagram of an optical correlator with optical access and an electronic store map 20. The correlator includes an input/object plane 21 which has an optical input and is for example an optically addressable spatial light modulator (OSLM) which is loaded from an optical disc 22 via transfer optics 23 under the control of control electronics 24. The correlator also includes lenses 25 and 26, and FTP/Correlation plane 27, an output plane 28, a scene plane 29 which has an electrical input (electrically addressable spatial light modulator ESLM) and is controlled by control electronics 24 and to which a search string can be applied. The arrangement of FIG. 14 can be coupled to a main frame computer and to auxiliary correlator as indicated. FIG. 15 indicates a block schematic diagram of an auxiliary correlator which has an electrical input but is otherwise similar to the "main" correlator and includes an input plane 21' lenses 25' and 26', correlation plane 27', output plane 28', control electronics 24' and electronic store map 20'. It should be noted that in FIG. 15 the control electronics and the store map are in common with the corresponding functions in FIG. 14.

The procedures by which projection and join can be achieved using such apparatus will now be described.

The procedures to achieve projection follows:

(1) Clear bit map store.
(2) Load first frame of information from backing store (optical disc as illustrated) into the input plane and make a hologram.
(3) If projection is conditional, set up search conditions as the scene and then search the store for matches. Set bit map location to one for all records that do not match.
(4) Read target field for the first record with a zero bit. Save target. It should be noted that all records can be printed out as they are saved, there is no need to complete the search before this is done.
(5) Present target field (plus conditions as in (3) if any) as scene. Set bit map for all records meeting the search condition. (These records are now eliminated).

(6) Read target in the next record with its bit not set. Save target. If not the last record go to (5). If the last record and no more frames then end. If more frames then go to (7).

(7) Load next frame of information from backing store into the input plane and make a hologram.
(8) Repeat (3) above.
(9) Present all target fields in turn from previous frame(s) (plus conditions as in (3) if any) as the scene. Set bits to one for all matching records. Go to (6).

In the join case, the objective is to search a specified number of files and select records meeting specified conditions. In general the conditions will be different for each file and the steps are: (1) Read the content of a specified target field(s) in each selected record and make a list of the content of those target fields; one list for each source file. (Note that for some selection criteria lists may contain redundancies and it may be necessary to subject them to a projection operation, however for simplicity that possibility will be neglected); (2) Compare all lists and select all contents meeting the specified selection criteria. (Normally this criteria will be a list of content that is common to the contents of all lists but it may be necessary to cater for other possibilities.)

Again, the basic spatially variant correlator is employed together with an electronic integer mapping store, capable of storing an integer for each member of a specified list, and the auxiliary correlator which has electrical rather than optical input but is otherwise similar in principle to the main correlator. The procedure to achieve join is as follows:

(1) select the file with the most records first (if this is known). Call this file F1.
(2) Produce a list of the contents of the target fields of F1 but meet the matching condition for F1. Call this list L'1.

(3) Set to zero all terms in the integer map corresponding in the number of its entries to the length of this list.

(4) Load L'1 into the auxiliary correlator (or as much of it as will go). Make a hologram in the FTP of the auxiliary correlator.

(5) (In parallel)—Process file F2 in the main correlator and produce list L'2 (as in (2) above).

(6) Input L'2 into the auxiliary correlator, item-by-item, as the scene. Increment by one the integer map for matching entries.

(7) If L'1 is too large for the auxiliary correlator, repeat for the rest of L'1.

(8) If these are more than two file, repeat (5), (6) and (7) for the remaining files.

(9) Print out items in the list L'1 for which the integer values in the integer map meet the required condition. End.

It should be noted that the auxiliary correlator is not vital to the procedure, the main correlator with the addition of an electrically addressed object input plane could be used but this would imply a more serial mode of operation which would be slower.

With regard to reading data out from the correlator, it is assumed that some form of match has been found to a record and it is required to read out a field from that record. The position of the required field in the record in the object plane is determined and the corresponding position of the field in the scene is calculated. The record can be read out a bit at a time but, because this is slow, an arrangement which reads out a character at a time is preferable, e.g. 13 bit positions at a time. This means that the width of the detector array in the output plane must be increased from 1 column to thirteen. One bit position, corresponding to say the start of the character field in the scene, is illuminated and the character is then read out in the output plane. The point of illumination steps on to the start of the next character in the scene and that is read out and so on until that read out of the field is complete. In essence the one bit corresponds to the reference beam and it is a well known holographic principle that the object can be reconstituted in the output plane if the reference beam is present in the input plane.

In terms of the Vander Lugt correlator, the basis on which this works is that the single point illumination corresponds to the reference beam during recording and by basic holographic principles the object is reproduced. The position of reproduction in the output plane is determined by the position of the point source in the scene.

With fixed length records the maximum length of the field is specified by the designer/programmer and if for any reason the length of the input data is longer than this maximum length, the data has to be truncated in some way to fit the available space. This approach has several disadvantages:

(a) Space is wasted because the field length is determined by something approaching the worst case rather than by tailoring space to fit the actual data. (Unused positions in the field have to be padded out with, for example, space characters).

(b) Unless the rules for truncation are fixed (i.e. not left to the whim of the person entering the data) the subsequent search procedure will be unreliable.

(c) Print out of data in truncated form may be unsuited in some applications.

Nevertheless, fixed length records are suited to and used in some applications.

With variable length records it is necessary to designate the length of every field and with (electronic) CAFS this is done by the use of a header (field identifier) consisting of two octets, one being the start of field marker and the other specifying the number of octets in the field. By allocating a single octet to the length function, the field length is limited to 256 octets but this is generally quite adequate for the majority of record formats. This approach has the overhead of the field identifier but unless the data contains a lot of single or two octet fields it is unlikely to save on storage space. In the context of optical searching and approach in which the length of every field had to be read out before the relative positions of the search strings can be determined means a highly serial approach and thus one that defeats the whole object of the exercise. Not only does reading out the field lengths take time but a search is needed in which an AND is performed on more than one field needs a different relative spacing in the search string for every record.

The following are possible solutions to the probable variable length records:

(a) Make all field lengths equal to the maximum of 256 octets, (b) Force all records into a limited set of fixed formats, (c) Use one fixed format with overflow.

Of these alternatives, (a) while simple is very inefficient; (b) raises doubts about being able to specify a set of formats in the absence of all the information that might be required to form the data base and in any case demands a fresh search attempt for each format; (c) appears to be more promising and is discussed below.

Based on the length statistics of data that fill some particular field, a maximum length for that field is determined, say, for example, on the basis that 95% of the data are of a length less than or equal to the maximum specified. When the input data exceed this length the final position in the field contains a special overflow symbol that indicates that the rest of the entry is to be found elsewhere. When searching, the maximum length of the field is known and the search string can be truncated to fit that length.

The problem then becomes one of how best to handle the overflow.

(a) One might exclude the overflow field from the primary search on the basis that a match on the underflow portion produces an acceptable error rate or that, because it is a rare occurrence, it can be subjected to a special filtering process. A special overflow field of fixed length could be added to the end of the record which would contain the overflow information and details of the structuring of that information. This field would not be suitable for a structured search but could be read out.

(b) If the overflow has to be included in the search process then this might be handled by producing an auxiliary record with identical layout to the main record but only containing the overflow portions of the relevant fields. The positions of these fields in the auxiliary record would of course be precisely defined in relation to the start of the main record and hence a structured single search would suffice.

(c) Rather than determining the field sizes on the basis of 95% of the data fitting the available space, a much lower figure might be taken, for example 60%. This would mean that an overflow record might be necessary in about half the cases and a double overflow, i.e. three records, might be necessary in a small minority of cases. In principle this can be extended to the nth degree. Taken to its logical conclusion this then results in the concept of a two dimensional record.

To determine which of these strategies involves the least storage it is necessary to examine the statistics of a representative set of data. This is done below, using the hypothesis (a) that on the basis that the rectangular figure with the highest ratio of area to circumference is a square, and (b) the most efficient record shape is also a square with dimensions determined by the average lengths of all the fields in the record.

As remarked above, in general, fields may be of fixed length, for example a data of birth can be expressed in a standard form and fitted into a specified field with the same number of digits in every entry, or it can be of variable length and a person's surname is a good example of this By picking names pseudo-randomly from a telephone directory a distribution for surnames lengths was established. It was found that to a fairly good approximation the logarithm of the number of letters in a surname fits a normal distribution. The antilog of the mean of this distribution is 5.75 letters and the antilog of the standard deviation is 1.38 letters. Thus the distribution is a fairly tight one, giving grounds for believing that by packing data based on an average word length, resonable efficiencies should be achievable.

A model for a record was thus established in which the number of bits allocated to a field in the X-dimension is fixed, a priori, and the actual data in the record are made to fit by adjusting the Y-dimension to suit. Thus if X=4 and a surname is 11 letters long it will need a Y dimension of 3, leaving one character position unused out of the 12 available.

Taking a field of surnames in isolation gives the following results:

| X-dimension | Packing Efficiency | X-dimension | Packing Efficiency |
|---|---|---|---|
| 1 | 100% | 5 | 76% |
| 2 | 92% | 6 | 70% |
| 3 | 86% | 15 | 44% |
| 4 | 80% | | |

X=1 corresponds to the case where records are tailored exactly to the field length and hence represents 100% efficiency.

For multiple fields the situation is more complex because the fields will, in general, all have different length distribution. To establish an initial position a specific example has been taken which is one assuming a record with the following fields:

F1=3 characters fixed length
F2=6 characters fixed length
F3=variable length field with surname distribution
F4=variable length field with surname distribution A short programme which used a random, Monte Carlo, selection procedure was used. The lengths of the fields in the X-dimension were varied and for 100 samples the actual space used is compared with the minimum space needed for 100% efficient packing. Results are tabulated below:

| Run No | F1X | F2X | F3X | F4X | $F_x$ | Packing Efficiency |
|---|---|---|---|---|---|---|
| 1 | 1 | 2 | 3 | 3 | 9 | 78% |
| 2 | 1 | 2 | 4 | 4 | 11 | 66% |
| 3 | 1 | 2 | 2 | 2 | 7 | 78% |
| 4 | 1 | 2 | 1 | 1 | 5 | 59% |
| 5 | 1 | 1 | 3 | 3 | 8 | 46% |
| 6 | 1 | 3 | 3 | 3 | 10 | 70% |

A record that was square for fields of avarage length would have an X-dimension $F_x$ given by $$F_x = F1_{AV} + F2_{AV} + F3_{AV} + F4_{AV}$$

which in this case gives $F_x 3+6+5.75+5.75=4.5$ The actual optimum value of $F_x$ is between 9 and 7, i.e. the value for runs 1 and 3. The problem is complicated because the X-dimensions have to be integers for each field and hence the value of $F_x$ tends to get rounded up. It would appear that the hypothesis that the optimum record size is a square of a dimension equal to the square root of the set of average field sizes is only a rough guide and in practice one needs to take account of the statistics of individual records. A packing efficiency of 78% was, however, higher than anticipated.

It will be apparent from the above that the function the optical correlator performs most efficiently is AND logic on a very large number of items in parallel. The operations the optical correlator does less well can be performed using conventional digital electronics and the handling of inequalities requires an at least partial electronic solution. The optical approach is quite well suited to projection and join and the augmentation of the correlator by an electronic map of record locations is a useful addition in these cases and also when the selector process involves certain types of logical relationships. An auxiliary correlator can also be used for join and special selection operations. The ability to read data, as well as correlation signals, from the correlator is important because it provides a low latency interface between the optics and the electronics.

I claim:

1. A holographic optical correlator including a matched optical filter and coupled thereto a control means including a memory, and wherein in use for searching the memory for occurrences of an item the control means controls the input and Fourier transform planes of the filter and a coherent light source for parallel optical processing of the memory content and the output plane of the filter provides information to the control means as to the location in the memory of occurrences of said item, and including means whereby the memory content is recorded in the Fourier transform plane, using a reference beam from said light source, as at least one coded pattern which together comprise an object, wherein the said item sought is a similarly coded pattern and is disposed in the input plane after recordal of said memory content and the matched filter then serves to locate the position of said item sought against a background comprised by said object, and including means whereby the coded pattern of said item sought can be moved step-by-step across the input plane in a first direction, and detection means in the output plane which serve to detect peak correlation signals within a predetermined range that corresponds to said location.

2. A correlator as claimed in claim 1 wherein the coded pattern of said item sought is replicated in the input plane in a second direction perpendicular to said first direction and the replicated coded patterns are moved step-by-step synchronously across the input plane.

3. A correlator as claimed in claim 2 and including means whereby all but any one of the replicated patterns may have their presence removed from the input plane in order to determine which replicated pattern is, or which replicated patterns are, producing the peak correlation signals.

4. A correlator as claimed in claim 1 and including a respective shift register with optical output for producing the coded pattern of each said item sought.

5. A correlator as claimed in claim 1 and wherein the detection means comprises a column of detectors placed centrally in the output plane and extending in said second direction.

6. A correlator as claimed in claim 5 wherein the coded pattern of said item sought is replicated in the input plane in a second direction perpendicular to said first direction and the replicated coded patterns are moved step-by-step synchronously across the input plane, and including means whereby when the replicated coded patterns have been moved in the first direction and the detection means indicate an approximate match, the replicated coded patterns are moved in the input plane in the second direction until a match is achieved on a middle detector of the column.

7. A correlator as claimed in claim 2 and wherein there are dual reference beams displaced from an axis extending in the first direction by equal amounts whereby the memory content is recorded twice.

8. A correlator as claimed in claim 1 wherein said item sought comprises a scene, and wherein complementary coding is used for the object and scene, the scene coded pattern being the complement of the object coded pattern.

9. A correlator as claimed in claim 1 and for searching a file containing a list of records, wherein the memory includes a file store, and including an electronic bit map store for holding a map corresponding to file record patterns on the file store.

10. A correlator as claimed in claim 1 and for searching a predetermined number of files and selecting records meeting predetermined conditions, and including an electronic integer mapping store capable of storing an integer for each member of a predetermined list.

11. A correlator as claimed in claim 10 further including an auxiliary correlator which performs correlation operations on data received from the matched optical filter.

12. A correlator as claimed in claim 1 and wherein the memory is in optical disc form and including transfer optic means between said disc and the input plane.

13. A correlator as claimed in claim 12 and including an electronic store map coupled to said control means.

14. A correlator as claimed in claim 1 wherein the said sought item and the memory contents comprise variable length records which are arranged in a two dimensional format whereby to minimise storage space.

15. A correlator as claimed in claim 1, wherein the detection means comprise a plurality of columns of detectors extending in a direction perpendicular to the first direction and disposed in the output plane, whereby the peak correlation signals within the predetermined range that correspond to said location can be detected in any one of the plurality of columns.

16. A holographic optical correlator including a matched optical filter and coupled thereto a control means including a memory, and wherein in use for searching the memory for occurrence of an item the control means controls the input and Fourier transform planes of the filter and a coherent light source for parallel optical processing of the memory content and the output plane of the filter provides information to the control means as to the location in the memory of occurrences of said item, and including means whereby the memory content is recorded in the Fourier transform plane, using a reference beam from said light source, as at least one coded pattern which comprises an object, wherein the said item sought is a single similarly coded pattern and is disposed in the input plane after recordal of said memory content and wherein said reference beam source is located in the input plane as far as possible from the position of the single coded pattern in at least one dimension in order to reduce the effect of astigmatism.

17. A correlator as claimed in claim 16 wherein the coded pattern of the item comprises a scene, and wherein the scene is illuminated by said light source and is positioned on an edge of the input plane opposite to an edge thereof used for the reference beam during the recording phase.

18. A holographic optical correlator including a matched optical filter and coupled thereto a control means including a memory, and wherein in use for searching the memory for occurrences of an item the control means controls the input and Fourier transform planes of the filter and a coherent light source for parallel optical processing of the memory content and the output plane of the filter provides information to the control means as to the location in the memory of occurrences of said item, and including means whereby the memory content is recorded in the Fourier transform plane, using a reference beam from said light source, as at least one coded pattern which comprises an object, wherein the said item sought is a single coded pattern comprising a scene, or a plurality of similarly coded patterns, wherein complementary coding is used for the object and scene, the scene coded pattern being the complement of the object coded pattern, and wherein, for searching a predetermined number of files and selection records meeting predetermined conditions, the memory includes an electronic integer map store capable of storing an integer for each member of a predetermined list, and further including an auxiliary correlator which performs correlation operations on data received from the matched optical filter.

19. A correlator as claimed in claim 16 wherein said item sought comprises a scene, and wherein complementary coding is used for the object and scene, the scene coded pattern being the complement of the object coded pattern.

20. A correlator as claimed in claim 16 and for searching a file containing a list of records, wherein the memory includes a file store and an electronic bit map store for holding a map corresponding to file record positions on the file store.

21. A correlator as claimed in claim 18 and for searching a file containing a list of records, wherein the memory includes a file store and an electronic bit map store for holding a map corresponding to file record positions on the file store.

22. A correlator as claimed in claim 16 and for searching a predetermined number of files and selecting records meeting predetermined conditions, the memory including an electronic integer mapping store capable of storing an integer for each member of a predetermined list.

23. A correlator as claimed in claim 22 further including an auxiliary correlator which performs correlation operations on data received from the matched optical filter.

24. A correlator as claimed in claim 16 and wherein the memory is in optical disc form and including transfer optic means between said disc and the input plane.

25. A correlator as claimed in claim 24 and including an electronic store map coupled to said control means.

26. A correlator as claimed in claim 25 further including an auxiliary correlator which performs correlation operations on data received from the matched optical filter.

27. A holographic optical correlator including a matched optical filter and coupled thereto a control means including a memory, and wherein in use for searching the memory for occurrences of an item the control means controls the input and Fourier transform planes of the filter and a coherent light source for parallel optical processing of the memory content and the output plane of the filter provides information to the control means as to the location in the memory of occurrences of said item, and including means whereby the memory content is recorded in the Fourier transform plane, using a reference beam from said light source, as at least one coded pattern which comprises an object, wherein the said item sought is a single coded pattern comprising a scene, or a plurality of similarly coded patterns, wherein complementary coding is used for the object and scene, the scene coded pattern being the complement of the object coded pattern, and wherein the message is in optical disc form, and including transfer optic means between said disc and the input plane, an electronic store map coupled to said control means and an auxiliary correlator which performs correlation operations on data received from the matched optical filter.

28. A correlator as claimed in claim 16 wherein the said sought item and the memory contents comprise variable length records which are arranged in a two dimensional format whereby to minimise storage space.

29. A correlator as claimed in claim 18 wherein the said sought item and the memory contents comprise variable length records which are arranged in a two dimensional format whereby to minimise storage space.

30. A holographic optical correlator including a matched optical filter and coupled thereto a control means including a memory, and wherein in use for searching the memory for occurrences of an item the control means controls the input and Fourier transform planes of the filter and a coherent light source for parallel optical processing of the memory content and the output plane of the filter provides information to the control means as to the location in the memory of occurrences of said item, and including means whereby the memory content is recorded in the Fourier transform plane, using a reference beam from said light source, as at least one coded pattern which comprises an object, wherein the said item sought is a single coded pattern comprising a scene, or a plurality of similarly coded patterns, wherein complementary coding is used for the object and scene, the scene coded pattern being the complement of the object coded pattern, wherein the said image sought is disposed in an input plane after recordal of said memory content and the matched filter then serves to locate the position of said item against a background comprised by said object, and including means whereby the coded pattern of said item sought can be moved step-by-step across the input plane in a first direction, and including detection means in the output plane, which detection means comprise a plurality of columns of detectors extending in a direction perpendicular to the first direction and disposed in the output plane, whereby minimum correlation signals within a predetermined range that correspond to said location can be detected in any one of the plurality of columns.

31. A holographic optical correlator including a matched optical filter and coupled thereto a control means including a memory, and wherein in use for searching the memory for occurrences of an item the control means controls the input and Fourier transform planes of the filter and a coherent light source for parallel optical processing of the memory content and the output plane of the filter provides information to the control means as to the location in the memory of occurrences of said item, and including means whereby the memory content is recorded in the Fourier transform plane, using a reference beam from said light source, as at least one coded pattern which comprises an object, wherein the said item sought is a similarly coded pattern and is disposed in the input plane after recordal of said memory content and the matched filter then serves to locate the position of said item sought against a background comprised by said object, and including detection means in the output plane which serve to detect correlation signals within a predetermined range that correspond to said location, and wherein once having detected said location said item sought is removed from the input plane and a point source of light substituted at a specific one of said item's previous bit positions, whereupon N bits of information stored adjacently to said detected location are read out on N columns of detectors in the output plane which comprise said detection means.

32. A correlator as claimed in claim 31 wherein the coded pattern of said item sought is replicated in the input plane and the replicated coded patterns are moved step-by-step synchronously across the input plane.

33. A method of searching a data base for occurrences of an item including the steps of forming a hologram of the data base contents in the Fourier transform plane of a matched optical filter and loading the item sought in the input plane of the matched optical filter, illuminating the loaded item sought with coherent light from the same source, or a source coherent therewith, as employed to produce the hologram, and detecting correlation signals at the output plane of the matched optical filter, determining if the correlation signals are within a predetermined range and thus recognition of the item sought in the data base, and in the event of a lack of a correlation signal within the predetermined range, moving the item sought step-wise across the input plane and detecting a respective correlation signal for each position thereof, and determining whether or not each said correlation signal is a correlation signal within the predetermined range, which step-wise movement is continued until either all possible steps have been taken or a signal within the predetermined range has been detected.

34. A method as claimed in claim 33 wherein the item sought is replicated in the input plane in a direction perpendicular to said step-wise movement, and said replications are moved step-wise synchronously across the input plane.

35. A method as claimed in claim 34 and wherein the detection is performed by a column of detectors in the output plane and when a peak correlation signal within the predetermined range is achieved the replications are moved in the input plane in said perpendicular direction until the peak correlation signal is detected on a middle detector of said column.

36. A method as claimed in any claim 33 wherein the items sought and the data base comprise coded patterns.

37. A method as claimed in claim 34 wherein the items sought and the data base comprise coded patterns and wherein once having detected said item sought it is removed from the input plane and a point source of light substituted at a specific one of said item's previous bit position, whereupon N bits of information stored adjacently to said detected item's location are read out on N columns of detectors in the output plane.

* * * * *